US011790906B2

(12) United States Patent
Goldfarb et al.

(10) Patent No.: US 11,790,906 B2
(45) Date of Patent: Oct. 17, 2023

(54) RESOLVING UNIQUE PERSONAL IDENTIFIERS DURING CORRESPONDING CONVERSATIONS BETWEEN A VOICE BOT AND A HUMAN

(71) Applicant: GOOGLE LLC, Mountain View, CA (US)

(72) Inventors: Rafael Goldfarb, Hadera (IL); Or Guz, Givatayim (IL); Lior Alon, Ramat Gan (IL); Assaf Hurwitz Michaely, New York, NY (US); Golan Pundak, New York, NY (US); Shmuel Leibtag, Tel Aviv (IL); Tomer Amiaz, Tel Aviv (IL); Dan Rasin, Givatayim (IL); Asaf Aharoni, Ramat Hasharon (IL)

(73) Assignee: GOOGLE LLC, Mountain View, CA (US)

( * ) Notice: Subject to any disclaimer, the term of this patent is extended or adjusted under 35 U.S.C. 154(b) by 129 days.

(21) Appl. No.: 17/157,207

(22) Filed: Jan. 25, 2021

(65) Prior Publication Data

US 2022/0238105 A1    Jul. 28, 2022

(51) Int. Cl.
*G10L 15/22*    (2006.01)
*G10L 15/06*    (2013.01)

(52) U.S. Cl.
CPC ............ *G10L 15/22* (2013.01); *G10L 15/063* (2013.01); *G10L 2015/0635* (2013.01)

(58) Field of Classification Search
CPC .................. G10L 15/22; G10L 15/063; G10L 2015/0635; G10L 15/08; G10L 2015/088;
(Continued)

(56) References Cited

U.S. PATENT DOCUMENTS 9,730,073 B1 * 8/2017 Kuehnel ............... H04W 12/50
10,896,034 B2 * 1/2021 Vinod .................... G06N 5/01
(Continued)

OTHER PUBLICATIONS

European Patent Office; International Search Report and Written Opinion issued in Application. No. PCT/US2021/060319; 17 pages; dated May 3, 2022.
(Continued)

*Primary Examiner* — Michael Colucci
(74) *Attorney, Agent, or Firm* — Gray Ice Higdon

(57) ABSTRACT

Implementations are directed to causing a voice bot to utilize a plurality of ML layers in resolving unique personal identifier(s) for a human while the voice bot is engaged in a corresponding conversation with the human. The unique personal identifier(s) can include a unique sequence of alphanumeric characters that is personal to the human. In some implementations, ASR speech hypothes(es) corresponding to spoken utterance(s) that include the unique personal identifier(s) can be processed to generate candidate unique personal identifier(s), given alphanumeric character(s) of the candidate unique personal identifier(s) can be selected, and the voice bot can prompt the human with clarification request(s) to clarify the given alphanumeric character(s) until it is predicted to correspond to the an actual unique personal identifier(s) for the human(s). The unique personal identifier(s) can then be utilized in performance of further action(s) by the voice bot and/or other systems.

18 Claims, 10 Drawing Sheets

(58) Field of Classification Search
CPC .............. G10L 15/16; G10L 2015/086; G10L 2015/228; H04W 12/50; G06N 3/84; G06F 3/167
See application file for complete search history.

(56) References Cited

U.S. PATENT DOCUMENTS

| | | | |
|---|---|---|---|
| 2005/0149260 A1* | 7/2005 | Bae ..................... | G01C 21/26 |
| | | | 701/533 |
| 2008/0281598 A1* | 11/2008 | Eide ..................... | G10L 15/22 |
| | | | 704/E15.04 |
| 2017/0148433 A1* | 5/2017 | Catanzaro ............... | G10L 25/18 |
| 2020/0175262 A1* | 6/2020 | Pitre .................... | G06V 40/172 |
| 2021/0073474 A1* | 3/2021 | Sengupta ............... | G06F 40/216 |
| 2021/0326751 A1* | 10/2021 | Liu ...................... | G06N 3/084 |
| 2022/0050966 A1* | 2/2022 | Yang .................... | G06F 40/35 |

OTHER PUBLICATIONS

Nuance; Auto Formating; https://www.nuance.com/products/help/dragon/dragon-for-mac6/enx/Content/Formatting/AutoFormatting.html; 4 pages; retrieved from the internet Jan. 28, 2021.
Nuance; Dictation Basics; https://www.nuance.com/products/help/dragon/dragon-for-pc/enx/professionalgroup/main/Content/Dictation/basic_dictation.htm; retrieved from internet Jan. 28, 2021.
European Patent Office; Invitation to Pay Additional Fees issued in Application No. PCT/US2021/060319; 10 pages; dated Mar. 9, 2022.

* cited by examiner

RESOLVING UNIQUE PERSONAL IDENTIFIERS DURING CORRESPONDING CONVERSATIONS BETWEEN A VOICE BOT AND A HUMAN

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed. An automated assistant generally responds to a command or request by providing responsive user interface output (e.g., audible and/or visual user interface output), controlling smart device(s), and/or performing other action (s).

Automated assistants typically rely upon a pipeline of components in interpreting and responding to user requests. For example, an automatic speech recognition (ASR) engine can be used to process audio data that correspond to a spoken utterance, to generate a transcription (i.e., sequence of term(s) and/or other token(s)) of the user's utterance. However, in performing ASR, certain term(s) may be misrecognized. This misrecognition can be exacerbated when the spoken utterance corresponds to a sequence of term(s) and/or other token(s) that are not predictable and/or are out of vocabulary. For example, email addresses, physical addresses, usernames, etc. may include sequences of letters, numbers, and/or symbols that are personal and meaningful to a user, but that are often misrecognized by ASR.

As a result of such misrecognition, the automated assistant may wastefully perform an action that was not intended by the user or prevent a further action from being performed. This can cause the user to repeat the same spoken utterance (which may be misrecognized again) or cause the user to perform some other action, thereby prolonging the human-to-computer dialog and/or causing additional computational resources to be consumed beyond the human-to-computer dialog. Additionally or alternatively, such misrecognition can cause the automated assistant to unnecessarily utilize network resources by erroneously transmitting emails and/or other electronic communication(s) to misrecognized email addresses, usernames, and/or other personal identifier(s). This can cause privacy concerns in that the automated assistant may erroneously transmit content that is personal to a user to the incorrect user. Additionally or alternatively, such misrecognition can cause the automated assistant to request a human take over the human-to-computer dialog, thereby prolonging the human-to-computer dialog and/or causing additional computational resources to be consumed in requesting the human take over the human-to-computer dialog.

SUMMARY

Implementations disclosed herein are directed to causing a voice bot to utilize a plurality of machine learning (ML) layers in resolving a unique personal identifier for a corresponding human while the voice bot is engaged in a corresponding conversation with the corresponding human. The unique personal identifier can include a unique sequence of alphanumeric characters that is personal to the human. The unique personal identifier can be, for example, an email address, a physical address, a username, a password, a name of an entity, a product identifier, a domain name, and/or any other unique personal identifier. In some implementations, one or more automatic speech recognition (ASR) speech hypotheses corresponding to a spoken utterance that includes the unique personal identifier can be processed, using the plurality of ML layers, to generate one or more candidate unique personal identifiers. Each of the one or more candidate unique personal identifiers can include one or more corresponding alphanumeric characters that are each associated with a corresponding predicted measure. Further, one or more of the corresponding alphanumeric characters of the candidate unique personal identifiers can be selected based on the corresponding predicted measures, and the voice bot can generate one or more prompts having corresponding clarification requests that request clarification with respect to one or more of the corresponding alphanumeric characters for the unique personal identifier. Based on a corresponding response from the human, one or more of the candidate unique personal identifiers can be refined. The voice bot can generate one or more additional prompts, and continue to refine tone or more of the candidate unique personal identifiers until it is predicted the given unique personal identifier corresponds to the actual unique personal identifier provided by the human. The given unique personal identifier can then be utilized by the voice bot for one or more further action(s), such as utilization in furtherance of the corresponding conversation and/or utilization in further of another action subsequent to the corresponding conversation.

As one example, assume the corresponding conversation between the human and the voice bot is conducted during a telephone call initiated by the human, and is associated with the human calling customer service for a utilities company (e.g., water provider, gas and electric provider, cable or internet provider, or the like). In this example, the voice bot can solicit a unique personal identifier corresponding to the human's email address to verify an identity of the human, to look up services associated with the email address, and/or to perform any other action requested by the human during the corresponding conversation. The voice bot can process, using an ASR model, audio data capturing a spoken utterance, from the human and that includes the email address, to generate a plurality of ASR speech hypotheses. Further assume the spoken utterance that includes the human's email address in this example is "john and then p@exampleurl.com". In this example, the plurality of ASR speech hypotheses may include ASR speech hypotheses of "jon and then p", "john and then p", "jon and then d", "john and then d", and/or other ASR speech hypotheses for the "johnp" portion of the email address. In this example, the voice bot can process, using the plurality of ML layers, one or more of the ASR speech hypotheses to generate one or more of the candidate unique personal identifiers.

Further, the voice bot can generate one or more of the prompts based on the corresponding predicted measures. For instance, the voice bot can generate a prompt of "and is that john with an h or no h?" Further assume the human provides an additional spoken utterance of "john with an h". In this example, the voice bot can process, using the ASR model, additional audio data capturing the additional spoken utterance to generate a plurality of additional ASR speech hypotheses, and the voice bot can process, using the plurality of ML layers, one or more of the additional speech hypotheses to refine the corresponding predicted measures and/or one or more of the candidate unique personal identifiers. In this example, the voice bot can update at least the corresponding predicated measure associated with the alphanumeric character "h" to indicate there is a high likelihood (e.g., using a binary value, a probability, a log likelihood, or the like) that the email address of the human begins with the sequence of alphanumeric characters of "j o h n". In doing so, the voice bot can restrict the one or more candidate unique personal identifiers to a subset that is restricted to those that begin with the sequence of alphanumeric characters of "j o h n", thereby eliminating any candidate unique personal identifiers that exclude the alphanumeric character "h". Moreover, the voice bot can generate additional prompts (e.g., "j o h n and then was that p as in papa or d as in delta"), and continue refining the corresponding predicted measures and/or one or more of the candidate unique personal identifiers until it is predicted to correspond to the email address of the human.

In some implementations, the voice bot can process one or more of the ASR speech hypotheses using the plurality of ML layers in response to predicting that the audio data capturing the spoken utterance includes the unique personal identifier. In some versions of those implementations, the voice bot can predict that the spoken utterance includes the unique personal identifier based on certain synthesized speech audio data, that includes synthesized speech that was previously generated by the voice bot, having been provided for presentation to the human during the corresponding conversation. For example, the voice bot may predict that the spoken utterance includes the unique personal identifier if the voice bot generated synthesized speech audio data that includes synthesized speech requesting that the human provide the unique personal identifier (e.g., "what is your email address?"). In some additional or alternative implementations, the voice bot can predict whether the spoken utterance includes the personal identifier based on the plurality of ASR speech hypotheses generated using the ASR model. For example, the system may predict that the spoken utterance includes the unique personal identifier if one or more of the plurality of ASR speech hypotheses includes a given alphanumeric character or string of alphanumeric characters that are indicative of a unique personal identifier (e.g., a string of numbers or city and state information for a physical address, a particular symbol or character (e.g., an "@" symbol, an underscore, etc.), and/or any other indicator that the spoken utterance includes the unique personal identifier).

In some implementations, the plurality of ML layers can correspond to those of transformer ML model(s) (e.g., input layers, encoding layers, decoding layers, feed-forward layers, attention layers, output layers, and/or other ML layers), unidirectional and/or bidirectional RNN models (e.g., input layers, hidden layers, output layers, and/or other ML layers), and/or other ML layers of other ML models. In some implementations, the plurality of ML layers can be used in processing one or more of the ASR speech hypotheses, to generate a tree of possibilities for the unique personal identifier. The tree of possibilities can include a plurality of nodes and a plurality of edges. Each of the plurality of nodes can be associated with (e.g., include or include data mapping the node to) given alphanumeric character(s) predicted for the unique personal identifier. Further, each of the plurality of nodes can include the corresponding predicted measure associated with the given alphanumeric character of the corresponding node for the unique personal identifier. The plurality of edges can connect one or more of the plurality of nodes. In implementations where the tree of possibilities is generated by processing one or more ASR speech hypotheses utilizing the plurality of ML layers, one or more of the candidate unique personal identifiers can be generated based on the tree of possibilities, and a given one of the candidate unique personal identifiers that is associated with the nodes having corresponding predicted measures that are predicted to correspond to the unique personal identifier can be selected. In additional or alternative implementations, the plurality of ML layers, in processing one or more of the ASR speech hypotheses, can generate one or more of the candidate unique personal identifiers directly using the plurality of ML layers.

In various implementations, the voice bot can process, using the plurality of ML layers, and along with one or more of the ASR speech hypotheses, a corresponding intent of the voice bot that is associated with the synthesized speech audio data presented for presentation to the human prior to receiving the spoken utterance. The intent of the voice bot can include, for example, requesting the human provide the unique personal identifier, requesting the human spell the unique personal identifier, requesting the human clarify one or more alphanumeric characters of the unique personal identifier, requesting the human verify the unique personal identifier, and/or any other intent. By processing the intent of the voice bot along with one or more of the ASR speech hypotheses, the plurality of ML layers can be utilized to resolve a correct personal identifier in a more quick and efficient manner. For example, if the voice bot generates a prompt requesting clarity with respect to a given alphanumeric character (e.g., "is that p as in papa or d as in delta" for the email address "johnp@exampleurl.com"), the intent of the voice bot associated with the prompt previously presented to the human can be processed utilizing the ML layers, thereby utilizing the intent in refining the unique personal identifier with respect to particular alphanumeric characters. In implementations where the plurality of ML layers are utilized to generate the tree of possibilities for the unique personal identifier, this enables the voice bot to perform a beam search over the tree of possibilities with respect to the particular alphanumeric character, and quickly and efficiently update the tree of possibilities, thereby quickly and efficiently refining one or more of the candidate unique personal identifiers. Moreover, in implementations that utilize the intent of the voice bot, the plurality of ML layers can obtain a higher level of robustness and/or accuracy with less training instances than if the intent is not utilized.

In some implementations, the voice bot can determine whether to generate one or more of the prompts based on the corresponding predicted measures associated with one or more of the candidate unique personal identifiers. In some versions of those implementations, the voice bot can generate a prompt that requests the human spell or provide the unique personal identifier on a character-by-character basis if the corresponding predicted measure associated with one or more of the alphanumeric characters fails to satisfy a threshold (e.g., "can you spell that for me?", etc.). In some additional or alternative versions of those implementations, the voice bot can generate a prompt that requests the human clarify one or more particular alphanumeric characters for the unique personal identifier (e.g., "so it begins with t as in tango?", "was that f as in foxtrot or s as in sierra?", etc.). In some additional or alternative versions of those implementations, the voice bot can generate a prompt that requests the human verify the unique personal identifier (e.g., "so the email address is johnp @exampleurl.com", etc.). In some implementations, the voice bot can predict one or more of the candidate unique personal identifiers corresponds to the actual unique personal identifier based on each of the corresponding predicted measures associated with each of the alphanumeric characters of the given one of the candidate unique identifiers satisfying a threshold.

In some implementations, the corresponding conversation between the human and the voice bot may be conducted during a telephone call performed using various voice communication protocols. In additional or alternative implementations, the corresponding conversation between the human and the voice bot may be conducted during a human-to-computer dialog session between the human and the voice bot. As noted above, in these and other implementations, the given unique personal identifier can be utilized by the voice bot in furtherance of the corresponding conversation in response to determining the given one of the candidate unique personal identifiers does, in fact, correspond to the actual unique personal identifier. In implementations where the corresponding conversation is conducted during a telephone call between the voice bot and the human, the voice bot can utilize the unique personal identifier to continue performance of a task requested by the human (e.g., for customer service, for inquiries related to a user account, and/or any other task that may be performed during a telephone call). For example, the voice bot can utilize the unique personal identifier to verify or authenticate an identity of the human, to search for information related to the unique personal identifier, and/or any other manner in which the voice bot can utilize the unique personal identifier to continue performance of the telephone call. In implementations where the corresponding conversation is conducted during a dialog session between the voice bot and the human, the voice bot can utilize the unique personal identifier to incorporate the unique personal identifier into a transcription (e.g., while the human is utilizing the voice bot to dictate an email, a text message, an SMS message, a note, a calendar entry, and/or otherwise dictating to the voice bot), to perform an action on behalf of the user (e.g., making a purchase on behalf of the user, logging into an account of a user, and/or any other action on behalf of the user), to transmit to content to the user (e.g., electronic content when the unique personal identifier corresponds to an email and/or physical content when the unique personal identifier corresponds to a physical address) and/or any other manner in which the voice bot can utilize the unique personal identifier in furtherance of the corresponding conversation.

In various implementations, and prior to the voice bot utilizing the plurality of ML layers in determining the unique personal identifiers during the corresponding conversation, the plurality of ML layers can be trained based on a plurality of training instances. Each of the plurality of training instances can include training instance input and training instance output. The training instance input can include one or more of: one or more ASR speech hypotheses for a unique personal identifier, audio data corresponding to the one or more ASR speech hypotheses, or an intent of the voice bot that is associated with synthesized speech audio data presented for presentation to the human prior to receiving the audio data. The training instance output can include ground truth output corresponding to the unique personal identifier that includes ground truth alphanumeric characters for the unique personal identifier and/or corresponding ground truth predicted measures for the ground truth alphanumeric characters for the unique personal identifier. In some implementations, and with appropriate permission(s) from participant (s), one or more of the plurality of training instances can be generated based on actual conversations that include at least one human participant (e.g., actual conversations between a human and a voice bot or actual conversations between multiple humans). In additional or alternative implementations, one or more of the plurality of training instances can be synthetically generated based on actual unique personal identifiers stored in one or more databases.

In some versions of those implementations, the plurality of ML layers can be trained for utilization in a single turn of a corresponding conversation. For example, and for a given training instance, the training instance input can be processed using the plurality of ML layers to generate a corresponding predicted measure for each alphanumeric character included in the unique personal identifier. Further, the corresponding predicted measure for each alphanumeric character included in the unique personal identifier can be compared to the training instance output (e.g., on a character-by-character basis). Based on this comparison, one or more losses can be generated, and one or more of the plurality of ML layers can be updated based on one or more of the losses. In some additional or alternative versions of those implementations, the plurality of ML layers can be further trained for utilization in n additional turns of the corresponding conversation via a simulator (e.g., where n is a positive integer greater than 1). For example, one or more candidate unique personal identifiers can be generated based on the corresponding predicted measures (and optionally using the tree of possibilities), a simulated voice bot portion of the simulator can process one or more of the candidate unique personal identifiers to generate a simulated prompt, a simulated human portion of the simulator can generate a simulated response based on the simulated prompt and based on the ground truth output for the given training instance, and the plurality of ML layers can process the simulated response to refine one or more of the candidate unique personal identifiers. For example, assume the unique personal identifier is an email address of "johnp@exampleurl.com", and the corresponding predicted measures for predicted alphanumeric characters for the email address indicate that it may end with "p" or "d". In this example, the simulated prompt generated using the simulated voice bot portion of the simulator can be "was that p as in papa or d as in delta", and the simulated response generated using the simulated human portion of the simulator can be "p as in papa" based on the prompt and based on the ground truth output that includes the corresponding alphanumeric character "p". The simulation can continue in this iterative manner for n turns until one or more of the candidate unique personal identifiers is predicted to correspond to the actual unique personal identifier associated with the given training instance. In various implementations, the plurality of ML layers can be trained based on the plurality of training instances for single turns of corresponding conversation until one or more conditions are satisfied before the further training for the n turns of the corresponding conversations.

In some implementations, the plurality of training instances utilized to train the plurality ML layers can be obtained based on actual conversations and/or synthetically generated to reflect actual distributions of unique personal identifiers. This allows the plurality of ML layers, when utilized by the voice bot, to obtain a high level of precision and/or recall for actual in-use unique personal identifiers. Further, by obtaining a high level of precision and/or recall for unique personal identifiers, corresponding conversations that include the unique personal identifiers can be concluded can be more quickly and efficiently since the plurality of ML layers that are utilized by the voice bot and that are trained using the techniques described herein are more able to understand the nuances of human speech and respond accordingly to resolve the unique personal identifiers. Moreover, voice bots that utilize the plurality of ML layers described herein are more scalable, and memory consumption is reduced since the plurality of ML layers can be shared amongst multiple disparate voice bots. For instance, multiple third-parties may develop respective voice bots for particular tasks without having to train the respective voice bots to determine unique personal identifiers. Rather, the respective voice bots can each simply use the plurality of ML layers (or respective instances thereof).

The above description is provided as an overview of only some implementations disclosed herein. Those implementations, and other implementations, are described in additional detail herein.

DETAILED DESCRIPTION

Figure 1:
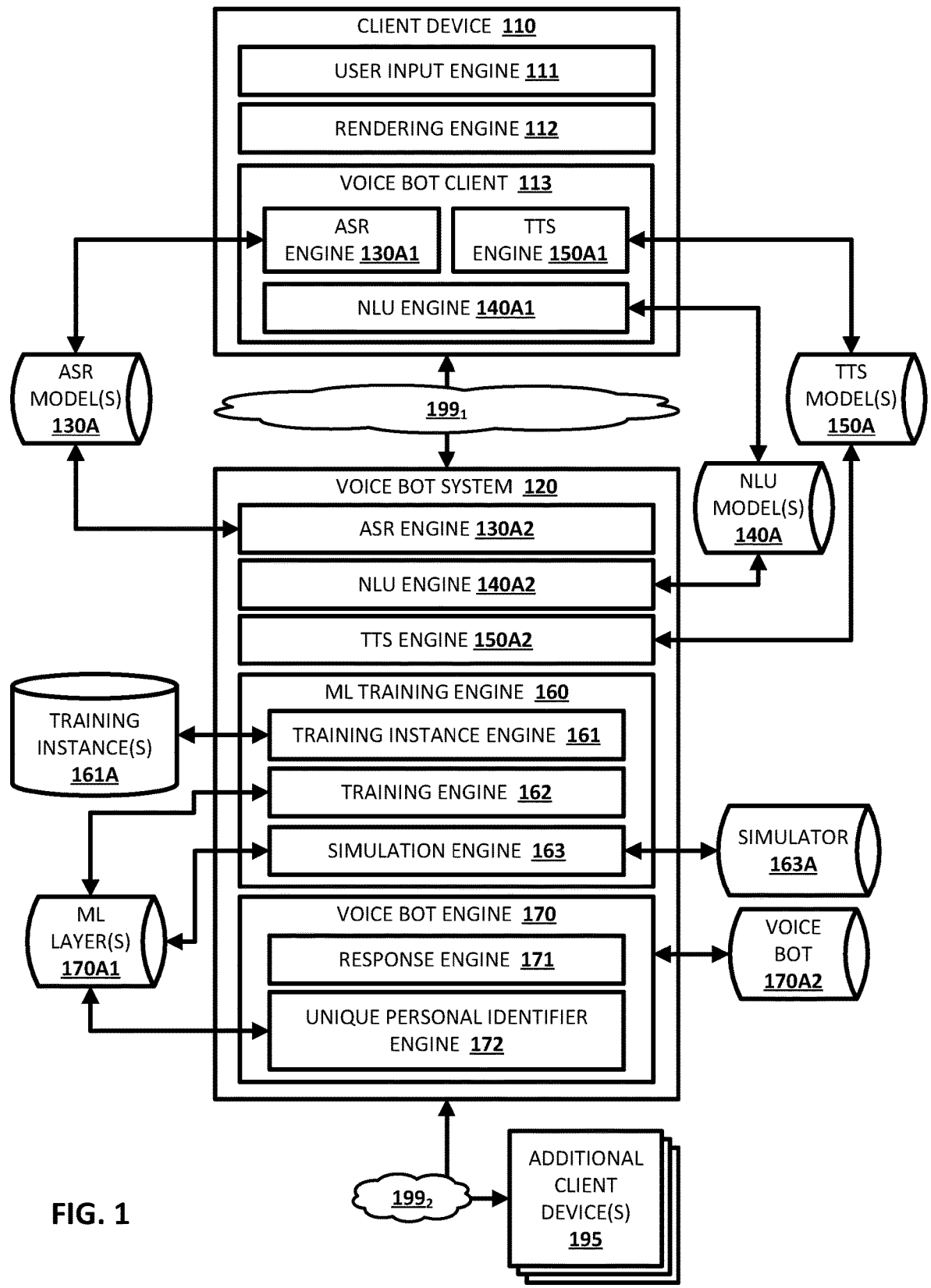
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 111, rendering engine 112, and voice bot client 113. The client device 110 can be, for example, a standalone assistant device (e.g., having microphone(s), speaker(s), and/or a display), a smartphone, a laptop, a desktop computer, a tablet, a wearable computing device, a vehicular computing device, and/or any other client device capable of implementing the voice bot development system client 113.

The user input engine 111 can detect various types of user input at the client device 110. The user input detected at the client device 110 can include spoken input detected via microphone(s) of the client device 110, touch input detected via user interface input device(s) (e.g., a touchscreen) of the client device 110, and/or typed input detected via user interface input device(s) (e.g., via a virtual keyboard on a touchscreen, a physical keyboard, a mouse, a stylus, and/or any other user interface input device of the client device 110) of the client device 110. The rendering engine 112 can cause content to be visually and/or audibly rendered at the client device 110 for presentation to a user (or human) via user interface output devices. The output can include, for example, various types of user interfaces associated and/or notifications associated with the voice bot that may be visually rendered via a display of the client device 110 and/or audibly via speaker(s) of the client device 110, and/or any other output described herein that can be visually and/or audibly rendered via the client device 110.

The voice bot client 113 can include, in various implementations, an automatic speech recognition (ASR) engine 130A1, a natural language understanding (NLU) engine 140A1, and a text-to-speech (TTS) engine 150A1. Further, the voice bot development client 113 can communicate with a voice bot system 120 over one or more networks $199_1$ (e.g., any combination of Wi-Fi, Bluetooth, near-field communication (NFC), local area networks (LANs), wide area networks (WANs), ethernet, the Internet, and/or other networks). The voice bot client 113 and the voice bot system 120 form, from the perspective of a user interacting with the client device 110, a logical instance of a voice bot. Although the voice bot system 120 is depicted in FIG. 1 as being implemented remotely from the client device 110 (e.g., via one or more servers), it should be understood that is for the sake of example and is not meant to be limiting. For example, one or more aspects of the voice bot development 120 can alternatively be implemented locally at the client device 110 and/or one or more additional client devices 195 over one or more networks $199_2$.

A developer (e.g., a user of the client device 110) can interact with the voice bot system 120 (e.g., via the client device 110) to train a plurality of machine learning (ML) layers, of one or more ML models, stored in ML layer(s) database 170A1. The plurality of ML layers may correspond to those of transformer ML models (e.g., input layers, encoding layers, decoding layers, feed-forward layers, attention layers, output layers, and/or other ML layers), unidirectional and/or bidirectional RNN models (e.g., input layers, hidden layers, output layers, and/or other ML layers), and/or other ML layers of other ML models. Further, the plurality of ML layers can be subsequently utilized by a voice bot, while conducting conversations with corresponding humans, to determine corresponding unique personal identifiers provided by the corresponding humans during the conversations. The corresponding unique personal identifiers can include any sequence of alphanumeric characters that is personal to a given human, and can be, for example, one or more of: an email address, a physical address, a username, a password, a product identifier, a name of an entity, or a domain name.

In some implementations, a single instance of the plurality of ML layers can be utilized in resolving the unique personal identifiers. For example, a single instance of the plurality of ML layers can be trained and utilized to resolve email addresses, physical addresses, etc. In some versions of those implementations, a type of the unique personal identifier (e.g., an email address, physical address, username, etc.) can optionally be processed along with one or more of the ASR speech hypotheses as described here in resolving the unique personal identifier. In additional or alternative implementations, multiple instances of the plurality of ML layers can be trained and utilized in resolving the unique personal identifier. For example, a first plurality of ML layers can be trained and utilized to resolve email addresses, a second plurality of ML layers can be trained and utilized to resolve physical addresses, a third plurality of ML layers can be trained and utilized to resolve usernames, and so on. In these implementations, the disparate plurality of ML layers may only be trained based on one or more training instances that correspond to the type of unique personal identifier for which the plurality of ML layers are being trained to resolve, and the type of unique personal identifier encountered during the corresponding conversation can be utilized to select the appropriate plurality of ML layers for processing one or more of the ASR speech hypotheses.

The voice bot can correspond to one or more processors that utilize a plurality of additional ML layers of one or more of the ML models stored in voice bot database 170A2, and can be a first-party voice bot or a third-party voice bot. As used herein, the term first-party refers to an entity that publishes the voice bot system, whereas the term third-party refers to an entity that is distinct from the entity associated with the first-party and did not publish the voice bot system. The developer that trains the plurality of ML layers can be a first-party developer associated with a first-party entity or a third-party developer associated with a third-party entity.

In some implementations, the voice bot can be an example-based voice bot. For example, an example-based voice bot can be trained based on a plurality of training instances that are obtained based on corresponding conversations. The corresponding conversations can be, for example, demonstrative conversations that are defined by the developer for purposes of training the voice bot and/or previously concluded conversations that may or may not include an instance of the voice bot as a participant in the previously concluded conversations. In additional or alternative implementations, the voice bot can be a rules-based voice bot. For example, a rules-based voice bot can be associated with one or more intent schemas that are at least in part defined by the developer. The intent schemas can, for example, define one or more responses the voice bot should provide in response to determining an intent of a human included in a spoken utterance of the human engaged in a corresponding conversation with the voice bot. In contrast with a rules-based voice, an example-based voice bot can be trained to process audio data capturing spoken utterances (or speech hypothes(es) corresponding thereto) to directly predict one or more of the responses the voice bot should provide without directly determining the intent of the human.

The corresponding conversations described herein in which the voice bot can utilize the plurality of ML layers can include any conversation between the voice bot and a human that is associated with the client device 110 and/or one or more of the additional client devices 195. In some implementations, a given corresponding conversation can be conducted during a corresponding telephone call in which the voice bot engages in a corresponding conversation with a human. The corresponding telephone calls described herein can be performed using various voice communication protocols (e.g., Voice over Internet Protocol (VoIP), public switched telephone networks (PSTN), and/or other telephonic communication protocols. As described herein, synthesized speech can be rendered as part of the corresponding telephone call by the voice bot which can include injecting the synthesized speech into the corresponding telephone call so that it is perceivable by the human engaged in the corresponding conversation. The synthesized speech can be generated and/or injected by the client device one of the endpoints of the corresponding telephone call (e.g., the voice bot system 120, the client device 110, and/or one of the additional client devices 195). In additional or alternative implementation, a given corresponding conversation can be conducted during a corresponding dialog session in which a human associated with the client device 110 and/or one of the additional client devices 195 invokes the voice bot to perform an action on behalf of the human. The corresponding conversations are described below (e.g., with respect to FIGS. 6A-6C).

The voice bot system 120 includes, in various implementations, ASR engine 130A2, NLU engine 140A2, TTS engine 150A2, ML training engine 160, and voice bot engine 170. The ML training engine 160 can be utilized to train the plurality of ML layers that are subsequently utilized by the voice bot in determining corresponding unique personal identifiers during the corresponding conversations, and can include, in various implementations, training instance engine 161, training engine 162, and simulation engine 163. Further, the voice bot engine 170 can subsequently utilize the voice bot to conduct the corresponding conversations, and can include, in various implementations, a response engine 171 and a unique personal identifier engine 172.

In some implementations, the ASR engine 130A1 of the client device 110 (or one of the additional client devices 195) can process, using ASR model(s) 130A, the audio data that captures a spoken utterance. In additional or alternative implementations, the client device 110 can transmit the audio data to the voice bot system 120 over the network(s) 199$_1$ and/or 199$_2$, and the ASR engine 130A2 can process, using ASR model(s) 130A, the audio data that captures the spoken utterance. The ASR engine(s) 130A1 and/or 130A2 can generate a plurality of ASR speech hypotheses for the spoken utterance based on the processing of the audio data, and can optionally select a particular speech hypotheses as recognized text for the spoken utterance based on a corresponding value associated with the plurality of ASR speech hypotheses (e.g., binary values, probability values, log likelihood values, and/or other values). In various implementations, the ASR model(s) 130A are end-to-end speech recognition model(s), such that the ASR engine(s) 130A1 and/or 130A2 can generate the plurality of ASR speech hypotheses directly using the model. For instance, the ASR model(s) 130A can be end-to-end model(s) used to generate each of the plurality of ASR speech hypotheses on a character-by-character basis (or other token-by-token basis). Some non-limiting examples of such end-to-end model(s) used to generate the recognized text on a character-by-character basis are recurrent neural network transducer (RNN-T) models and transformer models. An RNN-T model is a form of sequence-to-sequence model that does not employ attention mechanisms, whereas a transformer model does employ attention mechanisms. In other implementations, the ASR model(s) 130A are not end-to-end speech recognition model(s) such that the ASR engine(s) 130A1 and/or 130A2 can instead generate predicted phoneme(s) (and/or other representations). For instance, the predicted phoneme(s) (and/or other representations) may then be utilized by the ASR engine(s) 130A1 and/or 130A2 to determine a plurality of ASR speech hypotheses that conform to the predicted phoneme(s). In doing so, the ASR engine(s) 130A1 and/or 130A2 can optionally employ a decoding graph, a lexicon, and/or other resource(s). In various implementations, a corresponding transcription of any detected spoken utterances may be rendered visually using the rendering engine 112 via a display of the client device 110 (or one of the additional client devices 195).

In some versions of those implementations, the NLU engine 140A1 of the client device 110 and/or the NLU engine 140A2 of the voice bot system 120 can process, using NLU model(s) 140A, the recognized text generated by the ASR engine(s) 130A1 and/or 130A2 to determine intent(s) included in the spoken utterance. For example, if the client device 110 detects a spoken utterance of "tell Branden to send the prize money to my quick cash account and I'll see him later tonight", the client device 110 and/or the voice bot system 120 can process, using the ASR model(s) 130A1 and/or 130A2, audio data that captures the spoken utterance to generate recognized text corresponding to the spoken input, and can process, using the NLU model(s) 140A, the recognized text to determine at least an intent of adding generating a message with the a value for a message content parameter "send the prize money to my quick cash account and I'll you later tonight". In some versions of those implementations, the TTS engine 150A1 of the client device 110 and/or the TTS engine 150A2 of the voice bot system 120 can generate synthesized speech audio data that captures synthesized speech. The synthesized speech can be rendered audibly using the rendering engine 112 via one or more speakers of the client device 110 (or one of the additional client devices 195). The synthesized speech may capture any output generated by the voice bot or the voice bot system 120 described herein.

The training instance engine 161 can obtain a plurality of training instances for training the plurality of ML layers based on user input provided by the developer and detected at the client device 110 via the user input engine 111. The plurality of training instances can be stored in training instance(s) database 161A. Each of the plurality of training instances can include training instance input and training instance output. The training instance input can include one or more of: at least one ASR speech hypothesis for a unique personal identifier, audio data for which the at least one ASR speech hypothesis is generated, or an intent of the voice bot associated with synthesized speech to which the audio data is responsive. The training instance output can include ground truth output corresponding to the unique personal identifier.

Figure 3:
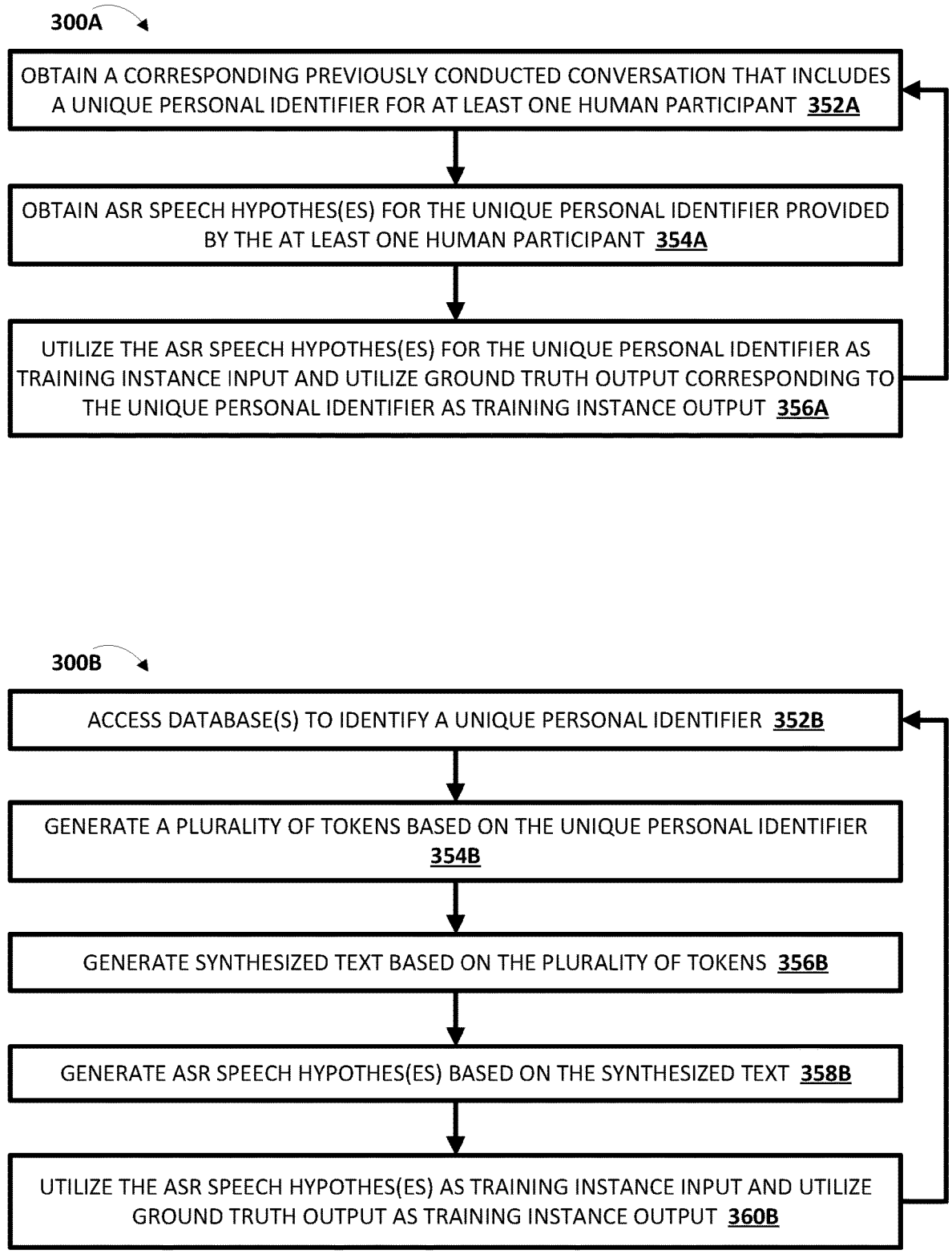
FIG. 3 depicts flowcharts illustrating example methods of obtaining training instances for training a plurality of machine learning layers to be utilized by a voice bot in determining unique personal identifiers, in accordance with various implementations.

In some implementations, one or more of the plurality of training instances can be obtained based on corresponding previously conducted conversations that include corresponding unique personal identifiers for a corresponding human (e.g., as described with respect to method 300A of FIG. 3). The corresponding previously conducted conversations may be between at least the corresponding human and an additional human and/or between at least the corresponding human and an instance of the voice bot. In implementations where a given previously conducted conversation is between at least the corresponding human and the additional human, one or more of the plurality of training instances can be generated based on one or more portions of the given previously conducted conversation.

For example, the training instance engine 161 can identify a portion of the given previously conducted conversation that includes the unique personal identifier, and utilize a given ASR speech hypothesis that includes the unique personal identifier as training instance input. The training instance engine 161 can identify the portion of the given previously conducted conversation that includes the unique personal identifier by causing the ASR engine 130A1 and/or 130A2 to process, using ASR model(s) 130A, corresponding portions of audio data for the given previously conducted conversation to generate a plurality of ASR speech hypotheses. Further, the training instance engine 161 can analyze one or more of the plurality of ASR speech hypotheses for the given previously conducted conversation to identify the portion that includes the unique personal identifier. For example, assume a given ASR speech hypothesis includes tokens corresponding to "my email address is . . . ", "my home address is . . . ", "my username is . . . ", or the like. In this example, the training instance engine 161 can identify the given ASR speech hypothesis as including the unique personal identifier (e.g., where the ellipses indicate the unique personal identifier follow). As another example, assume a given ASR speech hypothesis includes tokens corresponding to "what is your email address?", "can you please provide your home address?", "what's the username?", or the like. In this example, the training instance engine 161 can identify the given ASR speech hypothesis for subsequent audio data that is responsive to the question as including the unique personal identifier. In these examples, the given ASR speech hypothesis, that includes at least an ASR speech hypothesis for the unique personal identifier, can be utilized as training instance input for a given training instance.

Further, the training instance engine 161 can identify the ground truth output for the given training instance based on one or more supervision signals associated with the given previously conducted conversation. The one or more supervision signals can include, for example, the unique personal identifier being entered into a system during the given previously conducted conversation (and optionally successfully finding a match to the unique personal identifier in the system), the at least one human manually entering the unique personal identifier into the given previously conducted conversation (e.g., via typed input) and/or the at least one human editing a predicted unique personal identifier during the given previously conducted conversation to be the unique personal identifier (e.g., via touch input or typed input), a human reviewer subsequently correcting the unique personal identifier subsequent to the given previously conducted conversation, and/or any other supervision signal. The training instance input and the training instance output for the given training instance can be stored in the training instance(s) database 161A, and subsequently utilized to train the plurality of ML layers (e.g., as described with respect to the training engine 162).

In implementations where a given previously conducted conversation is between at least the corresponding human and the instance of the voice bot, one or more of the plurality of training instances can be generated based on one or more portions of the given previously conducted conversation. Notably, in these implementations, the plurality of ASR speech hypotheses may have been generated by the instance of the voice bot during the given previously conducted conversation. Accordingly, the training instance engine 161 can analyze the plurality of ASR speech hypotheses in the same or similar manner described above, and the given ASR speech hypothesis, that includes at least an ASR speech hypothesis for the unique personal identifier, can be utilized as training instance input for a given training instance. Further, the ground truth output corresponding to the unique personal identifier can be identified based on one or more of the supervision signals described above, and can be utilized as the training instance output for the given training instance. The training instance input and the training instance output for the given training instance can be stored in the training instance(s) database 161A, and subsequently utilized to train the plurality of ML layers (e.g., as described with respect to the training engine 162).

In additional or alternative implementations, one or more of the plurality of training instances can be obtained based on unique personal identifiers stored in one or more databases (e.g., as described with respect to method 3008 of FIG. 3). In some versions of those implementations, the training instance engine 161 can access one or more of the databases (not depicted) that include unique personal identifiers (e.g., an email address database, a physical address database, a username database, or the like), retrieve a given unique personal identifier from one or more of the databases, cause the TTS engine 150A1 and/or 150A2 to process, using TTS model(s) 150A, the given unique personal identifier to generate synthesized speech audio data that captures at least the given unique personal identifier, and cause the ASR engine 130A1 and/or 130A2 to process, using the ASR model(s) 130A, the synthesized speech audio data to generate a plurality of ASR speech hypothesis for the given unique personal identifier. In these implementations, at least one of the plurality of ASR speech hypothesis for the given unique personal identifier can be utilized as training instance input for a given training instance, and the given unique personal identifier (or tokens corresponding thereto) can be utilized as the ground truth output corresponding to the given unique personal identifier for the given training instance. The training instance input and the training instance output for the given training instance can be stored in the training instance(s) database 161A, and subsequently utilized to train the plurality of ML layers (e.g., as described with respect to the training engine 162).

In additional or alternative versions of those implementations, the training instance engine 161 can synthesize one or more training instances based on the given unique personal identifier retrieved from one or more of the databases (e.g., to preserve privacy of a human associated with the given unique personal identifier). The training instance engine 161 can generate a plurality of tokens based on the given unique personal identifier based on one or more distributions of n-grams. For example, assume the given unique personal identifier retrieved from one or more of the databases is an email address of "tatortator13@exampleurl.com". In this example, the email address may be composed of tokens of at least "tator", "tator", "13", and "exampleurl.com". The training instance engine 161 can replace one or more of the tokens based on one or more of the distributions of n-grams to modify the given unique personal identifier. For example, one or more of the distributions may indicate that tokens of "james", "john", "robert", "susan", and "karen" are more common than "tator" for unique personal identifiers, and, as a result, are more likely to be encountered when the plurality of ML layers are utilized by the voice bot. Accordingly, the training instance engine 161 can generate a modified unique personal identifier that includes at least the tokens of "john", "tator", "13", and "exampleurl.com".

Although only the token "tator" is depicted as being replaced with respect to the modified unique personal identifier, it should be understood that is for the sake of example and is not meant to be limiting and that the training instance engine 161 can replace any number of tokens for the given unique personal identifier. Moreover, one or more of the n-grams can be replaced based on respective distributions to generate the plurality of tokens corresponding to the unique personal identifier. For example, one or more of the n-grams can be replaced based on a distribution of first names, surnames, nicknames, and/or usernames, a distribution of non-name characters (e.g., special characters or symbols), a distribution of numbers, and/or any other distribution. For instance, less popular street names (e.g., "Keewood Court") can be replaced with more popular street names (e.g., "Main Street") in instances where the unique personal identifier corresponds to a street address. Accordingly, the tokens generated in synthesizing one or more of the training instances can more accurately reflect a rate or distribution for which the tokens are encountered when the plurality of ML layers trained on the plurality of training instances are subsequently utilized by the voice bot.

Further, the training instance engine 161 can process the plurality of tokens to generate synthesized text based on the plurality of tokens for the modified unique personal identifier. In some implementations, the training instance engine 161 can inject one or more fillers into the plurality of tokens. Continuing with the above example, the system can prepend or append one or more fillers to one or more of the plurality of tokens. For instance, the training instance engine 161 can prepend a filler of "oh sure it's uhh" prior to the email address resulting in synthesized text of "oh sure it's uhh johntator13@exampleurl.com", or append fillers of "then" or "as in" between one or more of the tokens resulting in synthesized text of "john then tator then 13 as in the number and @exampleurl.com", or the like. In some additional or alternative implementations, the training instance engine 161 can inject a phonetic spelling for one or more of the alphanumeric characters included in the given unique personal identifier. Continuing with the above example, the system can inject a phonetic spelling of "t as in tango" for "tator", resulting in synthesized text of "john then tator then 13 as in the number and @exampleurl.com, that's t as in tango". The system may inject the phonetic spelling for one or more of the alphanumeric characters based on a probability that an alphanumeric character included in a given token may be spelled out. For instance, alphanumeric characters of "t" and "d" may often be confused in speech recognition, so the probability that a human provides a phonetic spelling of "t as in tango" or "d as in dog" may be greater than the probability that a human provides a phonetic spelling of "z as in zulu". In these examples, the resulting synthesized text can include "my email is uhh john and then t as in tango a t o r 13 and then @exampleurl.com". By injecting the fillers and/or the phonetic spelling into the plurality of tokens to generate the synthesized text, the system may learn to ignore the fillers and to utilize the phonetic spelling in interpreting the modified unique personal identifiers.

Moreover, the training instance engine 161 can process the synthesized text to generate the given ASR speech hypothesis based on the synthesized text by injecting one or more ASR errors into the given speech hypo. In some implementations, the one or more ASR errors injected into the given ASR speech hypothesis can include supplanting one or more tokens included in the synthesized text with one or more corresponding homophone tokens. Continuing with the above example, the token "13" in the email address may be supplanted with "third teen", the token "tator" may be supplanted with "date her" or "tate her", and/or other tokens may be supplanted with corresponding homophone tokens. In some additional or alternative implementations, the one or more ASR errors injected into the given ASR speech hypothesis can include supplanting one or more alphanumeric characters of the synthesized text with one or more corresponding homophone alphanumeric characters. Continuing with the above example, the alphanumeric character "t" of the token "tator" can be replaced with "d" resulting in the token of "dator", and/or other alphanumeric characters may be supplanted with corresponding homophone alphanumeric characters. By injecting ASR errors into the given ASR speech hypothesis, the plurality of ML layers can be subsequently trained to handle these ASR errors that are likely to be encountered when the plurality of ML layers are deployed for use by the voice bot. The given ASR speech hypothesis can be utilized as training instance input for a given training instance, and the generated tokens (e.g., generated based on the given unique personal identifier and prior to generating the synthesized text) can be utilized as the ground truth output for the given training instance. The given training instance can be stored in the training instance(s) database 161A, and can be subsequently utilized to train the plurality of ML layers (e.g., as described with respect to the training engine 162).

The training engine 162 can utilize the plurality of training instances obtained by the training instance engine 161 (e.g., stored in the training instance(s) database 161A) to train the plurality of ML layers stored in the ML layer(s) database 170A1. The plurality of ML layers may correspond to those of transformer ML models (e.g., input layers, encoding layers, decoding layers, feed-forward layers, attention layers, output layers, and/or other ML layers), unidirectional and/or bidirectional RNN models (e.g., input layers, hidden layers, output layers, and/or other ML layers), and/or other ML layers of other ML models.

Figure 2A:
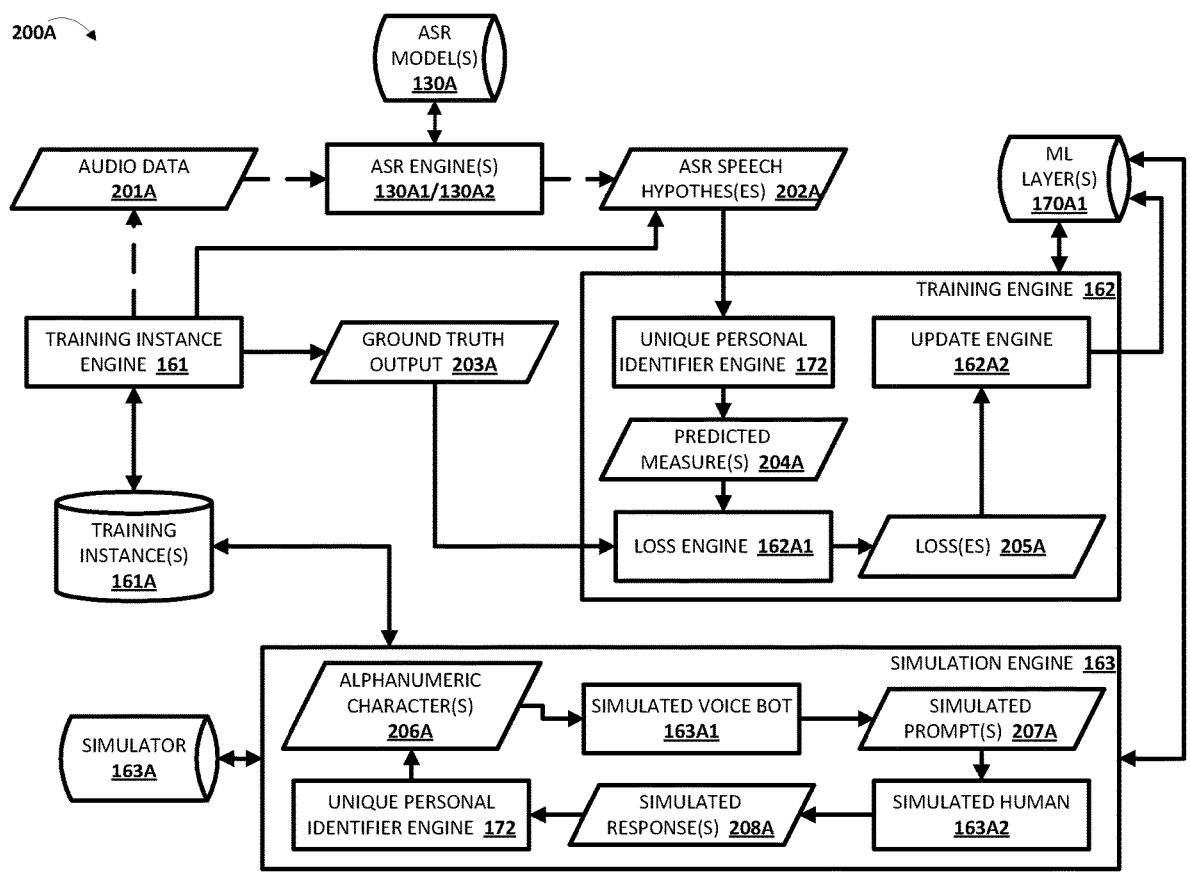
FIG. 2A depicts an example process flow for training a plurality of machine learning layers to be utilized by a voice bot in determining unique personal identifiers, in accordance with various implementations.

For example, and referring specifically to FIG. 2A, an example process flow 200A for training the plurality of ML layers to be utilized by the voice bot in determining unique personal identifiers is depicted. In some implementations, training instance engine 161 can obtain a given training instance, from among a plurality of training instances stored in the training instance(s) database 161A. In some implementations, training instance input, for the given training instance, can include one or more ASR speech hypotheses 202A corresponding to a unique personal identifier or corresponding modified unique personal identifier (referred to simply as unique personal identifier). In some versions of those implementations, one or more of the ASR speech hypotheses 202A can be stored in the training instance(s) database 161A prior to training of the plurality of ML layers (e.g., as described above with respect to the training engine 161). In additional or alternative versions of those implementations, one or more of the ASR speech hypotheses 202A can be generated during training. For example, audio data 201A capturing a spoken utterance that includes at least the unique personal identifier can be utilized as the training instance input. The training instance engine can cause the ASR engine(s) 130A1 and/or 130A3 to process, using the ASR model(s) 130A, the audio data 201A to generate one or more of the ASR speech hypotheses 202A. Further, training instance output, for the given training instance, can include ground truth output 203A corresponding to the unique personal identifier corresponding to the one or more speech hypotheses 202A.

The training engine 162 can cause the unique personal identifier engine 172 to process, using the plurality of ML layers stored in ML layer(s) database 170A1, one or more of the ASR speech hypotheses 202A to generate corresponding predicted measures 204A associated with one or more alphanumeric characters of the unique personal identifier corresponding to the one or more ASR speech hypotheses 202A. The corresponding predicted measures 204A can include binary values, probabilities, log likelihoods, or other measures corresponding to the likelihood of one or more of the alphanumeric characters corresponding to the actual alphanumeric characters of the unique personal identifier. Further, the training engine 162 can cause loss engine 162A1 to compare the corresponding predicted measures 204A associated with one or more alphanumeric characters of the unique personal identifier with ground truth measures for each of the alphanumeric characters of the unique personal identifier corresponding to the one or more ASR speech hypotheses 202A that are included in the ground truth output 203A. The loss engine 162A1 can generate one or more losses 205A based on the comparison. Moreover, the training engine 162 can cause update engine 162A2 to update the plurality of ML layers stored in the ML layer(s) database 170A1 based on one or more of the losses 205A.

For example, assume the unique personal identifier for the given training instance is a physical address of "1234 Keewood Court". Further assume one or more of the candidate unique personal identifiers generated for the "Keewood" portion of the physical address and based on the corresponding predicted measures 204A for each of the alphanumeric characters included in "Key wood", "Leewood", "Key would", "Qi wood", and/or other candidate unique personal identifiers. Each of the alphanumeric characters in each of the candidate unique personal identifiers may be associated with a given one of the corresponding predicted measures that are indicative of a likelihood of corresponding to one or more of the alphanumeric characters of the unique personal identifier. In this example, each of the alphanumeric characters of the "Keewood" portion of the physical address and/or the corresponding ground truth measures associated with each of the alphanumeric characters of the "Keewood" portion of the physical address can be compared to each of the corresponding alphanumeric characters of one or more of the candidate unique personal identifiers and/or the corresponding predicted measures 204A on a character-by-character basis. Further, one or more of the losses can be generated based on comparing the alphanumeric characters (e.g., cross-entropy loss), and can be utilized to update the plurality of ML layers. For instance, one or more of the losses can be backpropagated across one or more of the plurality of ML layers to update respective weights one or more of the plurality of ML layers.

The training engine 162 can continue training the plurality of ML layers in this manner based on one or more additional training instances stored in the training instance(s) database 161A. In some implementations, the training engine 162 continues training the plurality of ML layers in this manner until one or more conditions are satisfied. The one or more conditions can include, for example, validation of the plurality of ML layers that are updated, convergence of the plurality of ML layers that are updated (e.g., zero loss or within a threshold range of zero loss), determination that the plurality of ML layers perform better (e.g., with respect to precision and/or recall) than an instance of the plurality of ML layers currently being utilized (if any) by the voice bot, occurrence of training based on at least a threshold quantity of the plurality of training instances, and/or a duration of training based on the plurality of training instances. Notably, by training the plurality of ML layers in this manner, the plurality of ML layers can process one or more of the ASR speech hypotheses 202A and generate a predicted unique personal identifier. However, even with unlimited training and training resources, the plurality of ML layers may not be able to accurately predict every unique personal identifier that may be encountered from this initial turn of a corresponding conversation for which one or more candidate unique personal identifiers are generated.

Accordingly, in various implementations, the simulation engine 163 can configure a simulation environment that utilizes a simulator 163A to simulate additional turns of the corresponding conversation. In some implementations, and as described with respect to FIG. 2A, the simulator 163A can include a simulated voice bot portion 163A1 (e.g., an instance of the voice bot that utilizes the plurality of ML layers) and a simulated human portion 163A2 (e.g., an additional instance of the voice bot that utilizes the plurality of ML layers). In additional or alternative implementations, the developer may replace the simulated voice bot portion 163A1 and/or the simulated human portion 163A2 of the simulator 163A, and can provide input during a given simulation via one or more user interface input devices of the client device 110. Further, the simulated voice bot portion 163A1 and the simulated human portion 163A2 can have access to one or more databases that include candidate speech that may be utilized in generating prompts and/or responses described herein.

For example, assume the unique personal identifier for the given training instance is a physical address of "1234 Keewood Court". Further assume the simulation engine 163 causes the unique personal identifier engine 172 to process, using the plurality of ML layers, one or more ASR speech hypotheses corresponding to the physical address to generate on or more of the candidate unique personal identifiers generated for at least the "Keewood" portion of the physical address and based on corresponding predicted measures. Further assume the unique personal identification engine 172 selects a one or more alphanumeric characters 206A included in one or more candidate unique personal identifiers generated based on the corresponding predicted measures for one or more of alphanumeric characters that are predicted to correspond to the physical address. Further assume one or more of the alphanumeric characters 206A correspond to "K e y" for the "Kee" portion of "Keewood" for the unique personal identifier. The unique personal identifier engine 172 can determine an intent that the voice bot should utilize in subsequently generating one or more simulated prompts 207A based on the corresponding predicted measures associated with one or more of the given alphanumeric characters 206A. For example, unique personal identifier engine 172 can determine an intent associated with requesting clarity respect to one or more of the given alphanumeric characters 206A, requesting the human spell the unique personal identifier, and/or any other intent described herein.

Further, the simulation engine 163 can process, using the simulated voice bot portion 163A1 of the simulator 163A, one or more of the alphanumeric characters 206A (and optionally the intent) to generate one or more simulated prompts 207A that include corresponding clarification requests that request clarification with respect to one or more of the alphanumeric characters of the unique personal identifier. In some implementations, one or more of the simulated prompts 207A can be processed by the TTS engine(s) 150A1 and/or 150A2, using the TTS model(s) 150A, to generate synthesized speech audio data that can rendered for presentation to the developer via one or more speakers of the client device 110. For example, assume that the simulated voice bot portion 163A1 generates a first prompt of "does that start with k as in kilo" based on the corresponding predicted measure associated with "k" indicating that the voice bot is not highly confident in the selected alphanumeric character of "k".

Moreover, the simulation engine 163 can process, using the simulated human portion 163A2 of the simulator 163A, one or more of the simulated prompts 207A to generate one or more simulated responses 208A. The simulated human portion 163A2 of the simulator 163A may utilize ground truth output corresponding to the unique identifier in generating one or more of the simulated responses 208A. In some implementations, one or more of the simulated responses 208A may correspond to additional synthesized speech audio data that captures one or more of the simulated responses 208A generated using the TTS engine(s) 150A1 and/or 150A2. Continuing with the above example, assume that a first response of "yes, k as in kilo and then e e" is provided responsive to the first prompt. Further, the simulation engine 162 can cause the unique personal identifier engine 172 to process, using the plurality of ML layers, one or more speech hypotheses corresponding to the first response to refine one or more of the alphanumeric characters 206A. For instance, the unique personal identifier engine 172 can update the corresponding predicted measures to indicate it is highly likely the alphanumeric characters for "k e e" are correct, resulting in the refined unique personal identifier of "Kee wood" for the "Keewood" portion of the unique personal identifier.

The simulation engine 163 can cause the simulated voice bot portion 163A1 and the simulated human portion 163A2 to perform n additional turns of the simulated conversation (e.g., where n is a positive integer) until the voice bot until the one or more alphanumeric characters 206A correspond to the ground truth output for the unique personal identifier. For example, a next prompt may be "is Kee wood one word or two words?", and the next response may be "Yes", resulting in the refined unique personal identifier "Keewood". Further, a next prompt may be "so its K e e w o o d, all one word?", and the next response may be "Yes", resulting in the refined unique personal identifier "Keewood", thus resolving the unique personal identifier for the training instance. In some implementations, the one or more alphanumeric characters 206A may be considered to correspond to the ground truth output for the unique personal identifier when the corresponding predicted measures for each of the alphanumeric characters satisfy a threshold. In additional or alternative implementations, such as the above example, the one or more alphanumeric characters 206A may be considered to correspond to the ground truth output for the unique personal identifier when the human (or simulated human portion 163A2) verifies the predicted unique personal identifier is the actual predicted unique personal identifier. In some implementations, the simulation engine 163 continues training the plurality of ML layers in this manner until one or more conditions are satisfied (e.g., such as those described above).

In various implementations, the unique personal identifier engine 172 can process, using the plurality of ML layers, and along with other input (e.g., one or more of the ASR speech hypotheses 202A and/or one or more of the simulated responses 208A), an intent of the voice bot. For example, an intent associated with the voice bot for an initial turn of predicting the unique personal identifier (e.g., associated with one or more of the ASR speech hypotheses 202A) can include an intent of requesting that the unique personal identifier be provided, requesting that the unique personal identifier be spelled, and/or other intents. As another example, an intent associated with the voice bot for subsequent turns of refining the unique personal identifier (e.g., associated with one or more of the simulated responses 208A) can include an intent of requesting that one or more alphanumeric characters be verified, requesting that the unique personal identifier be spelled, requesting that the unique personal identifier be verified, and/or other intents. By processing the intent along with the other input, the unique personal identifier engine 172, the voice bot can better handle the input being processed by the plurality of ML layers, which allows the one or more alphanumeric characters 206A to be identified and refined more quickly and efficiently while maintaining the same level of precision and recall.

In additional or alternative implementations, the unique personal identifier engine 172 can process, using the plurality of ML layers, and along with other input (e.g., one or more of the ASR speech hypotheses 202A and/or one or more of the simulated responses 208A), a type of the unique personal identifier. The type of the unique personal identifier can correspond to whether it is an email address, physical address, username, etc. In additional or alternative implementations, the type of the unique personal identifier can be utilized by the unique personal identifier engine 172 subsequent to processing at least one or more of the ASR speech hypotheses. By processing the type of the unique personal identifier along with the other input, the voice bot can better handle the input being processed by the plurality of ML layers, which allows the one or more alphanumeric characters 206A to be identified and refined more quickly and efficiently while maintaining the same level of precision and recall. Although the plurality of ML layers are described as being trained in a particular manner and using a particular architecture, it should be understood that is for the sake of example and is not meant to be limiting.

Figure 2B:
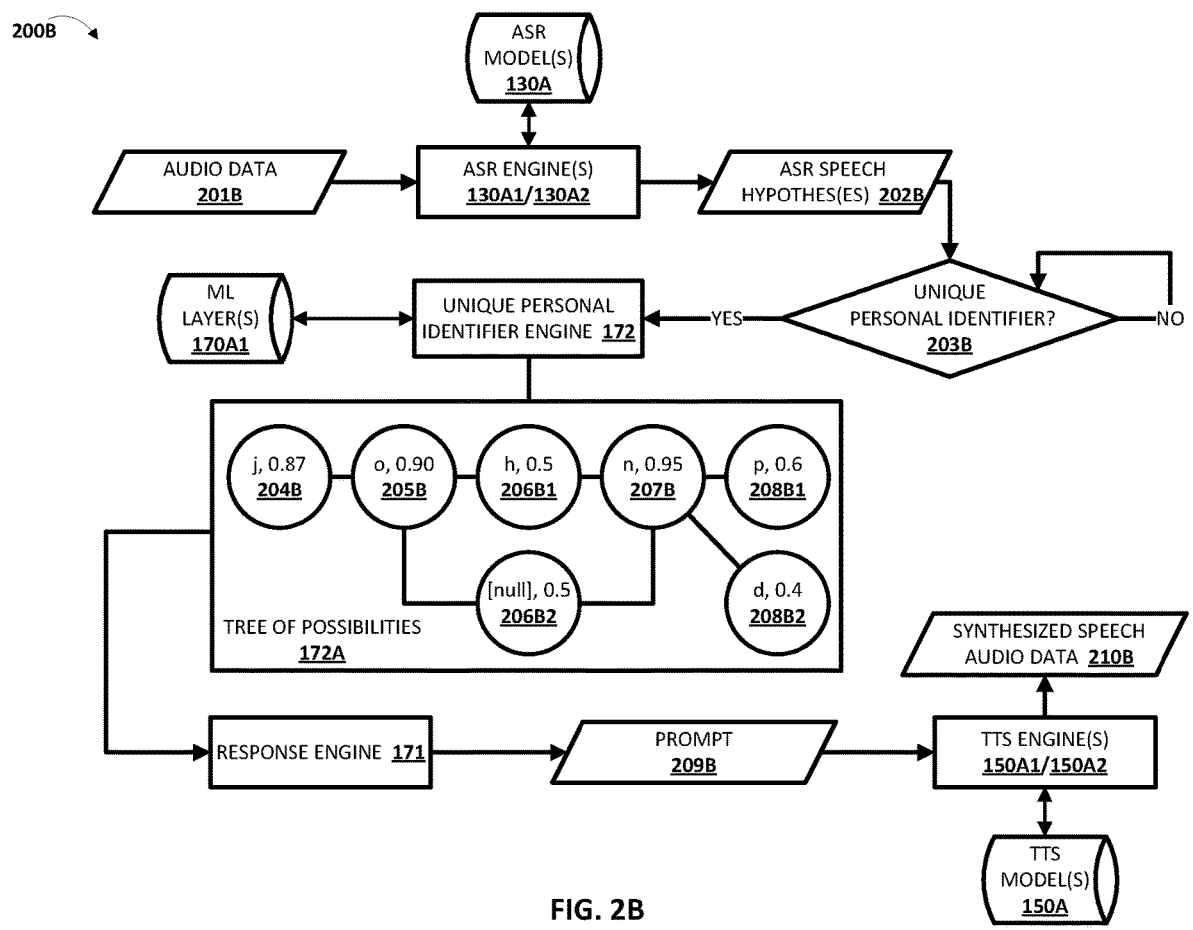
FIG. 2B depicts an example process flow for utilizing, by a voice bot, a plurality of machine learning layers in determining unique personal identifiers, in accordance with various implementations.

Subsequent to training the voice bot, the voice bot engine 170 can subsequently utilize the trained plurality of ML layers stored in the ML layer(s) database 170A1 and the voice bot stored in the voice bot database 170A2 to determine unique personal identifiers while the voice bot is conducting conversations. For example, and referring specifically to FIG. 2B, an example process flow 200B for utilizing, by the voice bot, the plurality of ML layers in determining unique personal identifiers is depicted. For the sake of example, assume the voice bot is associated with a supermarket self-checkout system implemented at one of the additional client devices 195 in communication with the voice bot system 120. Further assume a human has completed checking out at the supermarket self-checkout system, and that the voice bot has prompted the human to provide an email address to which the supermarket self-checkout system can send a receipt and/or other content (e.g., coupons, advertisements, and/or other promotional materials). In this example, audio data 201B capturing a spoken utterance that includes the email address can be processed by the ASR engine(s) 130A1 and/or 130A2 to generate one or more speech hypotheses 202B.

In some implementations, the voice bot can determine whether one or more of the speech hypotheses 202B correspond to a unique personal identifier at block 203B. In some versions of those implementations, the voice bot can determine whether one or more of the speech hypotheses 202B correspond to a unique personal identifier based on one or more of the speech hypotheses including tokens for one or more alphanumeric characters and/or one or more strings of tokens of alphanumeric characters that are indicative of the unique personal identifier. For example, if one or more of the speech hypotheses 202B include a "dot com" it may be determined that it includes an email address, if one or more of the speech hypotheses 202B include a city and state it may be determined that it includes a physical address, and so on for any other linguistic signals for various unique personal identifiers. In some additional or alternative implementations, the voice bot can determine whether one or more of the speech hypotheses 202B generated based on a spoken utterance received responsive to soliciting the unique personal identifier. If, at block 203B, the voice bot determines that the audio data 201B does not include a unique personal identifier, then the voice bot can continue to analyze additional audio to determine whether it includes a unique personal identifier. If, at block 203B, the voice bot determines that the audio data 201B includes a unique personal identifier, then the voice bot can cause the unique personal identifier engine 172 to process, using the plurality of ML layers stored in the ML layer(s) database 170A1, one or more of the ASR speech hypotheses 202B.

In some implementations, a tree of possibilities 172A can be generated based on output generated across the plurality of ML layers. The tree of possibilities can include a plurality of nodes 204B, 205B, 206B1, 206B1, 207B, 208B1, 208B2, and/or other nodes, and a plurality of edges connecting one or more of the nodes. Each of the plurality of nodes can be associated with an alphanumeric character and a corresponding predicted measure associated with the alphanumeric character. Further, one or more candidate unique personal identifiers can be generated based on the tree of possibilities 172, and a given candidate unique personal identifier can be selected from among the one or more candidate unique personal identifiers based on the corresponding predicted measures. In additional or alternative implementations, the unique personal identifier engine 172 can generate one or more of the candidate unique personal identifiers directly and without utilizing the tree of possibilities 172A.

Continuing with the above example, assume the email address captured in the audio data 201B is "johnp@exampleurl.com". In this example, and focusing on the "johnp" portion of the email address, the tree of possibilities 172A can include a first node 204B for the alphanumeric character "j" associated with a corresponding predicted measure of 0.87, a second node 205B for the alphanumeric character "o" associated with a corresponding predicted measure of 0.90, a third node 206B1 for the alphanumeric character "h" associated with a corresponding predicted measure of 0.5, a third alternative node 206B2 for the alphanumeric character "[null]" associated with a corresponding predicted measure of 0.5, a fourth node 207B for the alphanumeric character "n" associated with a corresponding predicted measure of 0.95, a fifth node 208B1 for the alphanumeric character "p" associated with a corresponding predicted measure of 0.6, a fifth alternative node 208B2 for the alphanumeric character "d" associated with a corresponding predicted measure of 0.4. In this example, the unique personal identifier engine may select a given unique personal identifier of "jonp", rather than "johnp" as intended by the user. Although each of the plurality of nodes depicted in FIG. 2B corresponds to a single alphanumeric character, it should be understood that is for the sake of example and is not meant to be limiting. For example, assume the corresponding predicted measure for two or more adjacent alphanumeric characters are indicative of corresponding to the unique personal identifier. In this example, the nodes for the two or more adjacent alphanumeric characters can be combined into a single node. As yet another example, assume the email address captured in the audio data 201B is "johnp25@exampleurl.com". In this example, the number portion "25" of the email address can be represented as one or more of the following nodes: "2", "5", "25", "twenty", "five", "twenty-five", "two", "five", and/or any other combination.

The response engine 171 can process the given unique personal identifier selected by the unique personal identifier engine 172 based on the tree of possibilities 172A. For example, even though the unique personal identifier selected the alphanumeric character "[null]" over the alphanumeric character "h", the response engine 171 can determine that the corresponding predicted measure for these nodes in the tree of possibilities (e.g., the third node 206B1 and the alternative third node 206B2) in within a threshold range, and generate a prompt 209B of "is that john with an h or jon without an h". Further, the TTS engine(s) 150A1 and/or 150A2 can process, using the TTS model(s) 150A, the prompt 209B to generate synthesized speech audio data 210B that included the prompt 209B.

Continuing with the above example, assume the human provides an additional spoken utterance that indicates the email address includes "john with an h". In this example, additional audio data capturing the additional spoken utterance in the same or similar manner described above, and the unique personal identifier engine 172 can process one or more additional ASR speech hypotheses corresponding to "john with an h". Based on the additional spoken utterance, the unique personal identifier engine 172 can update the tree of possibilities 172A. In this example, the tree of possibilities 172A can be updated to remove the third alternative node 206B2, and restrict any candidate unique identifiers to those that include "john with an h". The response engine 171 can generate an additional prompt to determine whether the email address includes a "p" or "d" in the same or similar manner. This process may be repeated until the unique personal identifier for the human is determined. Subsequent to determining the unique personal identifier for the human in this email, the receipt and/or other content can be transmitted to the email address of the human and a notification that the receipt was successfully sent may be rendered for presentation to the human at the self-checkout system.

In some implementations, the plurality of training instances utilized to train the plurality ML layers can be obtained based on actual conversations and/or synthetically generated to reflect actual distributions of unique personal identifiers. This allows the plurality of ML layers, when utilized by the voice bot, to obtain a high level of precision and/or recall for actual in-use unique personal identifiers. Further, by obtaining a high level of precision and/or recall for unique personal identifiers, corresponding conversations that include the unique personal identifiers can be concluded can be more quickly and efficiently since the plurality of ML layers that are utilized by the voice bot and that are trained using the techniques described herein are more able to understand the nuances of human speech and respond accordingly to resolve the unique personal identifiers. Moreover, voice bots that utilize the plurality of ML layers described herein are more scalable, and memory consumption is reduced since the plurality of ML layers can be shared amongst multiple disparate voice bots. For instance, multiple third-parties may develop respective voice bots for particular tasks without having to train the respective voice bots to determine unique personal identifiers. Rather, the respective voice bots can each simply use the plurality of ML layers (or respective instances thereof).

Turning now to FIG. 3, flowcharts illustrating example methods 300A and 300B of obtaining training instances for training a plurality of ML layers to be utilized by a voice bot in determining unique personal identifiers are depicted. For convenience, the operations of the methods 300A and 300B are described with reference to a system that performs the operations. This system of the methods 300A and 300B include at least one processor, at least one memory, and/or other component(s) of computing device(s) (e.g., client device 110 of FIG. 1, voice bot system 120 of FIG. 1, computing device 710 of FIG. 7, server(s), and/or other computing devices). Moreover, while operations of the methods 300A and 300B are shown in a particular order, this is not meant to be limiting. One or more operations may be reordered, omitted, and/or added.

In some implementations, one or more of the training instances can be obtained based on processing previously conducted conversations that include at least human participant. For example, and referring specifically to block 352A of the method 300A of FIG. 3, the system obtains a corresponding previously conducted conversation that includes a unique personal identifier for at least one human participant. The unique personal identifier may be included in a spoken utterance provided by the at least one human. In some implementations, the corresponding previously conducted conversation may be between multiple humans, such as the at least one human and an additional human. For example, the corresponding previously conducted conversation can be conducted during a telephone call in which the multiple humans are located in distinct environments, during an in-person conversation in which the multiple humans are co-located in the same environment, and/or other conversations between multiple humans.

In additional or alternative implementations, the corresponding previously conducted conversation may be between the at least one human and an instance of a voice bot. For example, the corresponding previously conducted conversation can be conducted during a telephone call between the at least one human and the instance of the voice bot (e.g., where the instance of the voice bot is implemented by a remote computing device), during a dialog session between the at least one human and the instance of the voice bot (e.g., where the instance of the voice bot is implemented by a local computing device), and/or other conversations between the at least one human and the instance of the voice bot.

At block 354A, the system obtains one or more ASR speech hypotheses for the unique personal identifier provided by the at least one human participant. In implementations where the corresponding previously conducted conversation is between multiple humans, the system may process, using an ASR model, the spoken utterance provided by the at least one human during the corresponding previously conducted conversation that includes the unique personal identifier to generate one or more of the ASR speech hypotheses for the unique personal identifier. For example, the spoken utterance provided by the at least one human during the corresponding previously conducted conversation that includes the unique personal identifier can be identified based on one or more terms of the spoken utterance provided by the at least one human being indicative of the unique personal identifier for the at least one human and/or based on one or more terms of a prior spoken utterance requesting the at least one human provide the spoken utterance that includes the unique personal identifier. For instance, the In implementations where the corresponding previously conducted conversation is between the at least one human and the instance of the voice bot, the system may identify one or more of the ASR speech hypotheses corresponding to the spoken utterance that includes the unique personal identifier that were generated during the corresponding previously conducted conversation. The system can identify one or more of the ASR speech hypotheses that includes the unique personal identifier based on one or more terms of the spoken utterance provided by the at least one human being indicative of the unique personal identifier for the at least one human. For example, one or more of the ASR speech hypotheses may include a particular alphanumeric character (e.g., an "@" sign or symbol for an email address) or a particular sequence of alphanumeric characters (e.g., a sting of numbers followed by a string of letters, followed by another string of numbers for a physical address). These ASR speech hypotheses can be identified as being indicative of corresponding to a unique personal identifier.

At block 356A, the system utilizes one or more of the ASR speech hypotheses for the unique personal identifier obtained at block 354A as training instance input for a given training instance, and utilizes ground truth output corresponding to the unique personal identifier as training instance output for the given training instance. The ground truth output corresponding to the unique personal identifier can be identified based on one or more supervision signals. The one or more supervision signals can include, for example, the unique personal identifier being entered into a system during the corresponding previously conducted conversation (and optionally successfully finding a match to the unique personal identifier in the system), the at least one human manually entering the unique personal identifier into the corresponding previously conducted conversation and/or the at least one human editing a predicted unique personal identifier during the corresponding previously conducted conversation to be the unique personal identifier (e.g., via touch input or typed input), a human reviewer subsequently correcting the unique personal identifier subsequent to the corresponding previously conducted conversation, and/or any other supervision signal.

The given training instance can be stored in one or more databases (e.g., the training instance(s) database 161A of FIG. 1), and the method 300A can be repeated to obtain additional training instances. In various implementations, one or more of the training instances can be obtained according to the method 300A in a synchronous manner such that the training instances are generated during the corresponding previously conducted conversation. In additional or alternative implementations, one or more of the training instances can be obtained according to the method 300A in an asynchronous manner such that the training instances are generated subsequent to the corresponding previously conducted conversation.

In additional or alternative implementations, one or more of the training instances can be obtained based on processing one or more unique personal identifiers stored in one or more databases that are accessible by the system. For example, and referring specifically to block 352B of the method 300B of FIG. 3, the system accesses one or more databases to identify a unique personal identifier. The one or more databases can include, for example, an email address database, a physical address database, a username database, a product identifier database, a named entity database, a domain name database, and/or any other database that includes unique personal identifiers.

At block 354B, the system generates a plurality of tokens based on the unique personal identifier. In some implementations, the system can identify a plurality of n-grams included in the unique personal identifier, and can generate the plurality of tokens corresponding to the unique personal identifier based on a distribution for the plurality of n-grams. For example, assume the unique personal identifier that is identified from one or more of the databases corresponds to an email address of "tatortator13@exampleurl.com". In this example, assume at least n-grams of "tator", "tator", "13", and "exampleurl.com" are identified. In this example, "tator" may not occur frequently in one or more distributions of n-grams for first names, surnames, nicknames, or usernames, so the first instance or second instance of "tator" may be replaced with another n-gram, such as "john" that occurs more frequently in the distribution, resulting in tokens of "john", "tator", "13", and "exampleurl.com" for the plurality of tokens. Notably, the originally identified token (e.g., at least n-grams of "tator", "tator", "13", and "exampleurl. com") may be utilized as the tokens. However, privacy of users associated with the unique personal identifiers may be preserved by using these techniques to generate the tokens while also preserving aspects of the unique personal identifiers that may be encountered in the real world. Further, the resulting tokens can more accurately reflect a distribution of unique personal identifiers by substituting n-grams that occur less frequently with those that occur more frequently. Although only one n-gram is depicted as being replaced with respect to the unique personal identifier, it should be understood that is for the sake of example and is not meant to be limiting and that any number of n-grams for the unique personal identifier may be replaced in generating the tokens. Moreover, one or more of the n-grams can be replaced based on respective distributions to generate the plurality of tokens corresponding to the unique personal identifier. For example, one or more of the n-grams can be replaced based on a distribution of first names, surnames, nicknames, and/or usernames, one or more distributions of non-name characters (e.g., special characters or symbols), one or more distributions of numbers, and/or any other distribution.

At block 356B, the system generates synthesized text based on the plurality of tokens. In some implementations, the system can inject one or more fillers into the plurality of tokens. Continuing with the above example, the system can prepend or append one or more fillers to one or more of the plurality of tokens. For instance, the system can prepend a filler of "oh sure it's" prior to the email address, or append fillers of "then" or "as in" between one or more of the n-grams. In some additional or alternative implementations, the system can inject a phonetic spelling for one or more of the alphanumeric characters included in the personal identifier. Continuing with the above example, the system can inject a phonetic spelling of "t as in tango" for "tator". The system may inject the phonetic spelling for one or more of the alphanumeric characters based on a probability that an alphanumeric character included in a given token may be spelled out. For instance, alphanumeric characters of "t" and "d" may often be confused in speech recognition, so the probability that a human provides a phonetic spelling of "t as in tango" or "d as in dog" may be greater than the probability that a human provides a phonetic spelling of "z as in zulu". In these examples, the resulting synthesized text can include "my email is uhh john t as in tango a t o r 13 @exampleurl.com". By injecting the fillers and/or the phonetic spelling into the plurality of tokens to generate the synthesized text, the system may learn to ignore the fillers and to utilize the phonetic spelling in interpreting the unique personal identifiers.

At block 358B, the system generates one or more ASR speech hypotheses based on the synthesized text. The system can generate one or more of the ASR speech hypotheses by injecting one or more ASR errors into one or more of the ASR speech hypotheses. In some implementations, the one or more ASR errors injected into one or more of the ASR speech hypotheses can include supplanting one or more n-grams included in the synthesized text with one or more corresponding homophone n-grams. Continuing with the above example, the n-gram "13" in the email address may be supplanted with "third teen", the n-gram "john" may be supplanted with "jon", the n-gram "tator" may be supplanted with "date her" or "tate err", and/or other n-grams may be supplanted with corresponding homophone n-grams. In some additional or alternative implementations, the one or more ASR errors injected into one or more of the ASR speech hypotheses can include supplanting one or more alphanumeric characters of the synthesized text with one or more corresponding homophone alphanumeric characters. Continuing with the above example, the alphanumeric character "t" of the n-gram "tator" can be replaced with "d" resulting in the n-gram of "dator", and/or other alphanumeric characters may be supplanted with corresponding homophone alphanumeric characters. BY injecting ASR errors into one or more of the ASR speech hypotheses, the plurality of ML layers can be subsequently trained to handle these ASR errors that are likely to be encountered when the plurality of ML layers are deployed for use by the voice bot.

At block 360B, the system utilizes one or more of the ASR speech hypotheses generated at block 358B as training instance input for a given training instance, and utilizes ground truth output as training instance output for the given training instance. The ground truth output corresponding to the unique personal identifier can be identified based on one or more supervision signals. The one or more supervision signals can include, for example, the unique personal identifier corresponding to the plurality of tokens generated by the system, a human reviewer subsequently providing the unique personal identifier, and/or any other supervision signal.

The given training instance can be stored in one or more databases (e.g., the training instance(s) database 161A of FIG. 1), and the method 300B can be repeated to obtain additional training instances. Notably, multiple instances of the method 300A and/or the method 300B can be performed in a serial or parallel manner to generate a plurality of training instances that are subsequently utilized to train the plurality of ML layers that are utilized by the voice bot in determining unique personal identifiers that are encountered during corresponding conversations.

Figure 4:
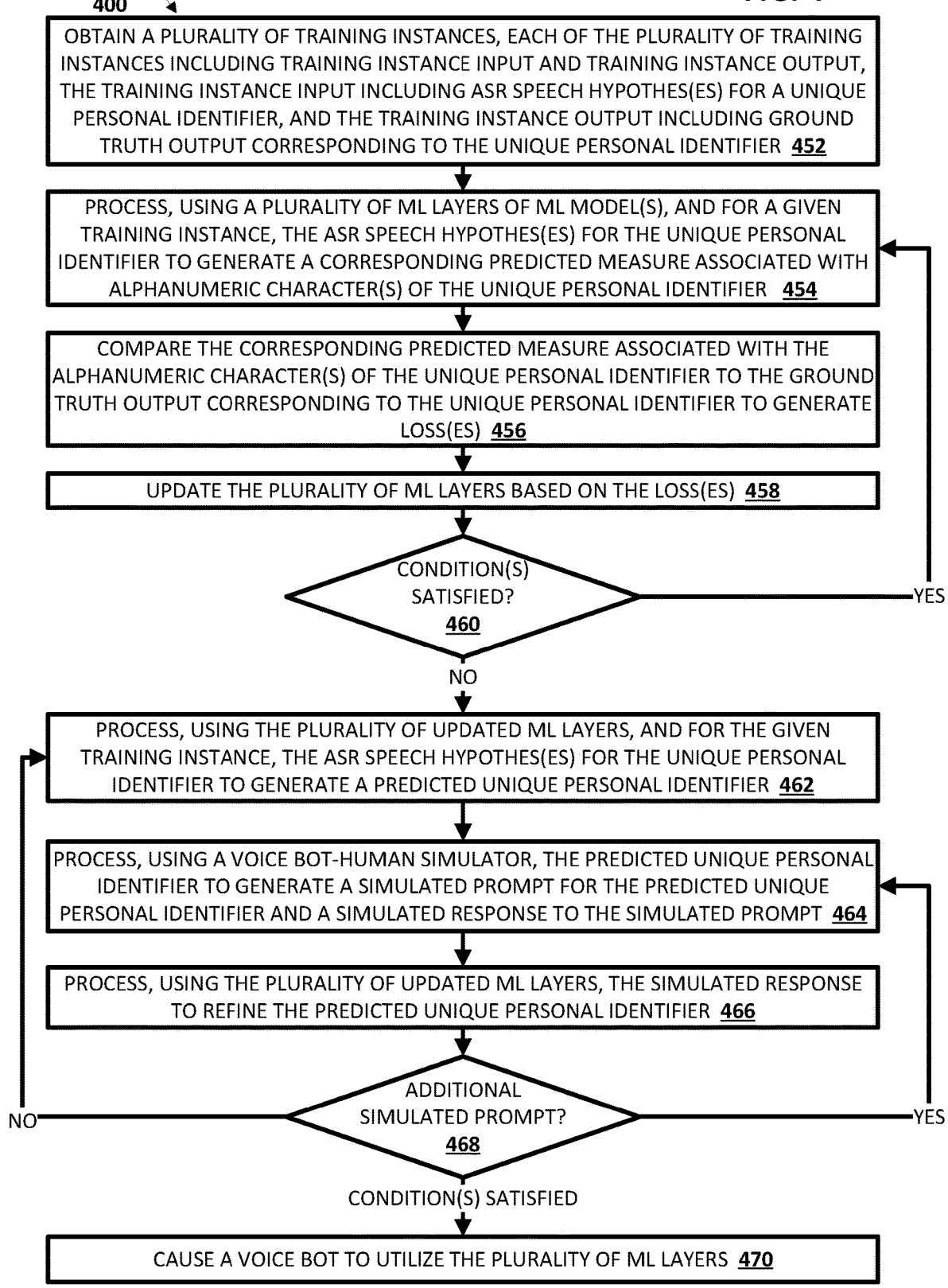
FIG. 4 depicts a flowchart illustrating an example method of training a plurality of machine learning layers to be utilized by a voice bot in determining unique personal identifiers, in accordance with various implementations.

Turning now to FIG. 4, a flowchart illustrating an example method 400 of training a plurality of machine learning layers to be utilized by a voice bot in determining unique personal identifiers is depicted. For convenience, the operations of the method 400 are described with reference to a system that performs the operations. This system of the method 400 includes at least one processor, at least one memory, and/or other component(s) of computing device(s) (e.g., client device 110 of FIG. 1, voice bot system 120 of FIG. 1, computing device 710 of FIG. 7, server(s), and/or other computing devices). Moreover, while operations of the method 400 are shown in a particular order, this is not meant to be limiting. One or more operations may be reordered, omitted, and/or added.

At block 452, the system obtains a plurality of training instances, each of the plurality of training instances including training instance input and training instance output, the training instance input including at least one or more ASR hypotheses for a unique personal identifier, and the training instance output including ground truth output corresponding to the unique personal identifier. The plurality of training instances can be obtained in the same or similar manner described with respect to the method 300A of FIG. 3 and/or the method 300B of FIG. 3. The unique personal identifier can include a sequence of alphanumeric characters that is personal to a given human. Further, the unique personal identifier can be, for example, an email address, a physical address, a username, a password, a product identifier, a name of an entity, and/or a domain name At block 454, the system processes, using a plurality of ML layers of one or more ML models, and for a given training instance, one or more of the ASR speech hypotheses for the unique personal identifier to generate a corresponding predicted measure associated with one or more alphanumeric characters of the unique personal identifier. The corresponding predicted measure can include a binary value, a probability, log likelihood, and/or any other measure corresponding to one or more of the alphanumeric characters. For example, assume the unique personal identifier associated with the given training instance corresponds to a username of "example1", and assume the one or more ASR speech hypotheses for the username "example1." include at least an ASR speech hypothesis corresponding to tokens of "x", "a", "m", "p", "l", "e", and "one". Further, each of the one or more alphanumeric characters can be associated with a probability as the corresponding predicted measure, such as a first probability associated with "x", a second probability associated with "a", and so on. Notably, one or more of the ASR speech hypotheses may include the tokens and respective measures for each of the tokens. However, in processing one or more of the plurality of ASR speech hypotheses, the plurality of ML layers can reweight the respective measures, thereby resulting in the corresponding predicted measures, and can analyze the corresponding predicted measures to remove or filter out those tokens that are not predicted to correspond to the unique personal identifier. In some implementations, the system can process, using the plurality of ML layers, and along with one or more of the ASR speech hypotheses, an intent of a voice bot. At instances of block 454, the intent of the voice bot may be an intent associated with requesting the unique personal identifier. By processing the intent along with one or more of the ASR speech hypotheses, the system can process ASR errors associated with initially requesting the unique personal identifier, and, when the plurality of ML layers are subsequently updated, the system can learn these ASR errors and refine predictions of the unique personal identifier based on these ASR errors.

At block 456, the system compares the corresponding predicted measure associated with one or more of the alphanumeric characters of the unique personal identifier to the ground truth output corresponding to the unique personal identifier to generate one or more losses. Continuing with the above example, further assume the ground truth output corresponding to the unique personal identifier includes ground truth tokens of "e", "x", "a", "m", p", "l", "e", and "1", where each of these tokens are associated with a corresponding ground truth probability. In this example, the system can compare the tokens of "x", "a", "m", "p", "l", "e", and "one" of the ASR speech hypothesis and the corresponding predicted measures to the ground truth tokens of "e", "x", "a", "m", p", "l", "e", and "1" of the ground truth output and the ground truth probabilities. For instance, the system can compare a token of "[null]" to ground truth character "e" since the system did not predict the silent "e" character", and a token of "one" to ground truth character "1" since the system predicted the word "one" rather than the letter "1". Further, the system can generate one or more losses (e.g., one or more cross-entropy losses) on this character-by-character basis.

At block 458, the system updates the plurality of ML layers based on one or more of the losses. For example, the system can cause one or more of the losses to be backpropagated across one or more of the plurality of ML layers to update respective weights of the one or more of the plurality of ML layers.

At block 460, the system determines whether one or more conditions are satisfied. The one or more conditions can include, for example, validation of the plurality of ML layers that are updated, convergence of the plurality of ML layers that are updated (e.g., zero loss or within a threshold range of zero loss), determination that the plurality of ML layers perform better (e.g., with respect to precision and/or recall) than an instance of the plurality of ML layers currently being utilized (if any) by the voice bot, occurrence of training based on at least a threshold quantity of the plurality of training instances, and/or a duration of training based on the plurality of training instances. If, at an iteration of block 460, the system determines that one or more of the conditions are not satisfied, then the system may return to block 454 to update the plurality of ML layers based on an additional training instance. In other words, the system can repeat the process of blocks 454, 456, 458, and 460 until the plurality of ML layers are sufficiently trained for a single turn portion of a corresponding conversation during which the plurality of ML layers are utilized to generate the corresponding predicted measures for unique personal identifiers. If, at an iteration of block 460, the system determines that one or more of the conditions are satisfied, then the system may proceed to block 462.

At block 462, the system processes, using the plurality of updated ML layers, and for the given training instance, one or more of the ASR speech hypotheses for the unique personal identifier to generate a predicted unique personal identifier. The system can process one or more of the ASR speech hypotheses in the same or similar manner described above with respect to block 454, but utilizing the updated plurality of ML layers. In some implementations, the system can process, using the plurality of layers, and along with one or more of the ASR speech hypotheses the intent of the voice bot. Similar to block 454, the intent of the voice bot at block 462 may include the intent of requesting the unique personal identifier. In some implementations, in generating the predicted unique personal identifier, the system can generate a tree of possibilities for the unique personal identifier using the plurality of updated ML layers. The tree of possibilities can include, for example, a plurality of nodes and a plurality of edges. Each of the plurality of nodes can correspond to a given alphanumeric character of the predicted unique personal identifier and be associated with the corresponding predicted measure for the given alphanumeric character, and the plurality of edges can connect one or more of the plurality of nodes. In some versions of those implementations, the system can traverse the tree of possibilities and/or perform a beam search of the tree of possibilities to generate the predicted unique personal identifier based on the tree of possibilities.

At block 464, the system processes, using a voice bot-human simulator, the predicted unique personal identifier to generate a simulated prompt for the predicted unique personal identifier and a simulated response to the simulated prompt. The voice bot-human simulator can correspond to one or more processors that implement a plurality of additional ML layers of one or more of the ML models, and can include a voice bot simulator portion and a human simulator portion. The system can process, using the simulated voice portion of the voice bot-human simulator, the predicted unique personal identifier and the corresponding predicted measures for the predicted unique personal identifier to generate the simulated prompt for a simulated human. In generating the simulated prompt, the system identifies a given alphanumeric character, from among one or more of the alphanumeric characters for the predicted unique personal identifier, that is associated with the corresponding predicted measure that fails to satisfy a threshold, and generates the clarification request that requests clarification with respect to the given alphanumeric character. For example, assume the unique personal identifier associated with the given training instance corresponds to a username of "example1", and assume the one or more ASR speech hypotheses for the username "example1." include at least an ASR speech hypothesis corresponding to tokens of "x", "a", "m", "p", "l", "e", and "one". Further assume the system is not highly confident that the username begins with "x". Accordingly, in this example, the system can generate the simulated prompt of "so it starts with x as in x-ray". Further, the system can process, using the simulated human portion of the voice bot-human simulator, the simulated prompt to generate the simulated response from a simulated human. Continuing with the above example, the system can generate the simulated response of "no, it starts with e and then x".

At block 466, the system processes, using the plurality of updated ML layers, the simulated response to refine the predicted unique personal identifier. In refining the predicted unique personal identifier, the system can update the one or more alphanumeric characters and/or the corresponding predicting measures for one or more of the alphanumeric characters. Continuing with the above example, the system can process the simulated response of "no, it starts with e and then x", resulting in the tokens of "e", "x", "a", "m", "p", "l", "e", and "one". In this example, a token for the alphanumeric character "e" is added to the one or more alphanumeric characters along with a corresponding predicted measure that indicates the system is highly confident that "e" corresponds to the first alphanumeric character of the unique personal identifier. Further, the corresponding predicted measure associated with the token for the alphanumeric character "x" can also be updated to indicate the system is highly confident that "x" corresponds to the second alphanumeric character of the unique personal identifier. In some implementations, and similar to block 454 and block 462, the system can process, using the plurality of ML updated layers, and along with one or more of the ASR speech hypotheses, an intent of a voice bot. However, at instances of block 466, the intent of the voice bot may be an intent associated with requesting clarification for the unique personal identifier. By processing the intent along with one or more of the ASR speech hypotheses, the system can refine predictions of the unique personal identifier based on these ASR errors by modifying the tree of possibilities (e.g., adding new nodes, removing existing nodes, adjusting the corresponding measures for one or more of the existing nodes, etc.).

At block 468, the system determines whether to generate an additional simulated prompt that includes an additional clarification request that requests additional clarification of one or more of the corresponding alphanumeric characters for the predicted unique personal identifier. The system can determine to generate the additional simulated prompt in response to determining the corresponding predicted measure associated with one or more of the alphanumeric characters for the refined predicted unique personal identifier fails to satisfy a threshold. Although block 468 is depicted as occurring after block 466, it should be understood that is for the sake of example and is not meant to be limiting. For example, an instance of block 468 may occur after block 462, after block 464, and/or after block 466 as depicted. Accordingly, if the system is confident enough in each of the one or more alphanumeric characters for the predicted unique personal identifier for the given training instance, then block 464 and 466 may be skipped for the given training instance.

If, at an iteration of block 468, the system determines to generate the additional simulated prompt, the system can return to block 464 to generate the additional simulated prompt (e.g., "is that the number 1 or is it spelled out") and may repeat this process until the system is highly confident in each of the alphanumeric characters for the predicted unique personal identifier. If, at an iteration of block 468, the system determines not to generate the additional simulated prompt, the system can return to block 462 to perform an additional simulation based on an additional training instance. The system may repeat the process of blocks 462, 464, 466, and 468 until one or more conditions are satisfied (e.g., the same or similar conditions described above with respect to block 460). In other words, and subsequent to the initial training of the plurality of ML layers by the process of blocks 454, 456, 458, and 460 described above, the plurality of ML layers can be further training for multi turn portions of the corresponding conversation during which the plurality of ML layers are utilized to generate clarification requests with respect to the alphanumeric characters and to refine the corresponding predicted measures for predicted unique personal identifiers based on the simulated responses to the clarification requests.

In response to determining one or more of the conditions are satisfied, the system may proceed to block 470. At block 470, the system causes a voice bot to utilize the plurality of ML layers. The voice bot can be a previously trained example-based or rules-based voice bot, and can utilize the plurality of ML layers in determining unique personal identifiers that are encountered when the voice bot is conducting conversations with corresponding humans.

Figure 5:
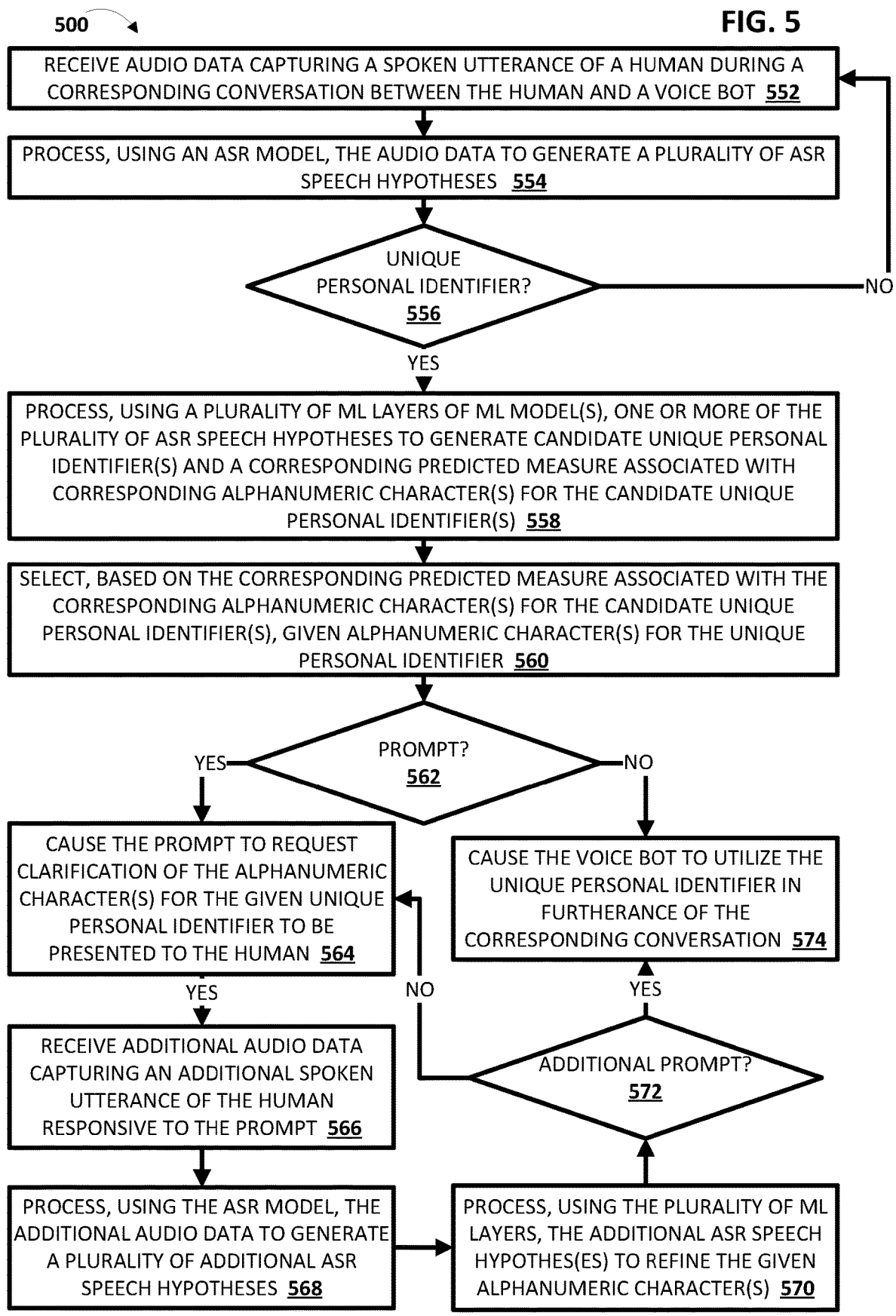
FIG. 5 depicts a flowchart illustrating an example method of utilizing, by a voice bot, a plurality of machine learning layers in determining unique personal identifiers, in accordance with various implementations.

Turning now to FIG. 5, a flowchart illustrating an example method 500 of utilizing, by a voice bot, a plurality of machine learning layers in determining unique personal identifiers is depicted. For convenience, the operations of the method 500 are described with reference to a system that performs the operations. This system of the method 500 includes at least one processor, at least one memory, and/or other component(s) of computing device(s) (e.g., client device 110 of FIG. 1, voice bot system 120 of FIG. 1, computing device 710 of FIG. 7, server(s), and/or other computing devices). Moreover, while operations of the method 500 are shown in a particular order, this is not meant to be limiting. One or more operations may be reordered, omitted, and/or added.

At block 552, the system receives audio data capturing a spoken utterance of a human during a corresponding conversation between the human and the voice bot. The audio data can be generated by one or more microphones of a client device of the human. In some implementations, the corresponding conversation can be conducted during a telephone call between the human and the voice bot via various voice communication protocols (e.g., VoIP, PSTN, and/or other telephonic communication protocols). In some additional or alternative implementations, the corresponding conversation can be conducted during a dialog session between the human and the voice bot.

At block 554, the system processes, using an ASR model, the audio data to generate a plurality of ASR speech hypotheses. In some implementations, the ASR is an end-to-end speech recognition model that can generate the plurality of speech hypotheses directly using the model (e.g., on a character-by-character basis or other token-by-token basis). In other implementations, the ASR model is not an end-to-end speech recognition model and can instead generate predicted phoneme(s) (and/or other representations), and can optionally employ a decoding graph, a lexicon, and/or other resource(s).

At block 556, the system predicts whether the spoken utterance includes a unique personal identifier. In some implementations, the system can predict whether the spoken utterance includes the personal identifier based on synthesized speech audio data including synthesized speech that was previously provided for presentation to the human by the voice bot during the corresponding conversation. For example, the system may predict that the spoken utterance includes the unique personal identifier if the voice bot previously requested that the human provide the unique personal identifier. In some additional or alternative implementations, the system can predict whether the spoken utterance includes the personal identifier based on the plurality of speech hypotheses generated using the ASR model. For example, the system may predict that the spoken utterance includes the unique personal identifier if one or more of the plurality of ASR speech hypotheses includes a given alphanumeric character indicative of a unique personal identifier (e.g., a string of numbers, a particular symbol or character (e.g., an "@" symbol, an underscore, etc.), and/or any other indicator that the spoken utterance includes the unique personal identifier).

If, at an iteration of block 556, the system predicts that the spoken utterance does not include the unique personal identifier, then the system may return to block 552 to receive additional audio data and repeat the process of blocks 552, 554, and 556 to determine whether the additional audio data captures an additional spoken utterance that includes the unique personal identifier. This process can be repeated for any further additional audio data received during the corresponding conversation. If, at an iteration of block 556, the system predicts that the spoken utterance includes the unique personal identifier, then the system may proceed to block 558.

At block 558, the system processes, using a plurality of ML layers of one or more ML models, one or more of the plurality of ASR speech hypotheses to generate one or more candidate unique personal identifiers and a corresponding predicted measure associated with one or more corresponding alphanumeric characters for the one or more candidate unique personal identifiers. The plurality of ML layers can be trained based on a plurality of training instances in the same or similar manner described with respect the method 400 of FIG. 4. For example, assume the unique personal identifier included in the spoken utterance is an email address of "johnp@exampleurl.com". Further assume the system generates a first candidate unique personal identifier having at least tokens of "j" associated with a first probability, "o" associated with a second probability, "n" associated with a third probability, and "p" associated with a fourth probability (e.g., corresponding to the alphanumeric sequence "jonp"), generates a second candidate unique personal identifier having at least tokens of "j" associated with a first probability, "o" associated with a second probability, "h" associated with a third probability, "n" associated with a fourth probability, and "d" associated with a fifth probability (e.g., corresponding to the alphanumeric sequence "johnd"), and so on. In some implementations, the system generates a tree of possibilities, and generates one or more of the candidate unique personal identifiers based on the tree of possibilities (e.g., as described with respect to FIG. 2B). In additional or alternative implementations, the system generates one or more of the candidate unique personal identifiers may be generated directly across the plurality of ML layers.

At block 560, the system selects, based on the corresponding predicted measure associated with the one or more corresponding alphanumeric characters for the one or more candidate unique personal identifiers, one or more given alphanumeric characters for the unique personal identifier. The system can select one or more of the given alphanumeric characters for the unique personal identifier, for example, on a token-by-token (or other character-by-character) basis, a candidate-by-candidate basis, and/or any other basis. Continuing with above example, the system can identify at least the tokens of "j", "o", "h", "n", "p", and "d" on a token-by-token basis as corresponding to the given unique personal identifier and based on the corresponding measures associated with each of these tokens, and can select one or more of the given alphanumeric characters, such as "j", "o", "n", and "p", resulting in a candidate unique personal identifier of "ionp", as corresponding to the given unique personal identifier based on the corresponding measures associated with each of these tokens for the unique personal identifier or a corresponding measure associated with the candidate unique personal identifier of "ionp" in its entirety.

At block 562, the system determines whether to generate a prompt that includes a clarification request that requests clarification of one or more of the given alphanumeric characters for the given unique personal identifier. The system can determine whether to generate the prompt in response to determining the corresponding predicted measure associated with one or more of the given alphanumeric characters for the given unique personal identifier fails to satisfy a threshold. If, at an iteration of block 562, the system determines not to generate the prompt, the system can refrain from generating the prompt and proceed to block 574. Block 574 is described below. If, at an iteration of block 562, the system determines to generate the prompt, the system can generate the prompt and may proceed to block 564. In generating the prompt, the system identifies one or more particular alphanumeric characters, from among one or more of the given alphanumeric characters, that is associated with the corresponding predicted measure that fails to satisfy the threshold, and generates the clarification request that requests clarification with respect to the given alphanumeric character. Continuing with the above example, assume at least the corresponding predicted measure associated with the token of "h" fails to satisfy the threshold. In this example, the system can identify the token of "h" and generate the prompt requesting clarification. For example, the prompt can include the clarification request "is there an h or no h", "is that jon with an h", "is it j o n or j o h n", "so its j o n", etc.

At block 564, the system causes the prompt to clarify one or more of the given alphanumeric characters to be presented to the human. The prompt can be rendered visually via a display of the client device or an additional client device of the human and/or can be rendered audibly via one or more speakers of the client device or the additional client device. At block 566, the system receives additional audio data capturing an additional spoken utterance of the human responsive to the prompt. At block 568, the system processes, using the ASR model, the additional audio data to generate a plurality of additional ASR speech hypotheses. At block 570, the system processes, using the plurality of ML layers, the additional ASR speech hypotheses to refine one or more of the given unique personal identifiers. Continuing with the above example, assume the prompt includes the clarification request of "is that jon with an 'h'", and that the prompt is rendered audibly for presentation to the human. Further assume the human provides the additional spoken utterance that indicates that unique personal identifier includes "john with an h". Accordingly, in processing one or more of the additional ASR speech hypothesis, the system can refine the given unique personal identifiers to include the token of "h", and to update the corresponding predicted measure associated with the token of "h" to indicate that the system is highly confident in the given unique personal identifier including the token of "h". In implementations where the given unique personal identifier is generated based on the tree of possibilities, any alternative nodes for the token of "h" can be removed from the tree of possibilities, such as a "null" node.

At block 572, the system determines whether to generate an additional prompt that includes an additional clarification request that requests additional clarification of one or more of the given alphanumeric characters. The system can determine to generate the additional prompt in response to determining the corresponding predicted measure associated with one or more of the given alphanumeric characters for the refined given unique personal identifier fails to satisfy a threshold. If, at an iteration of block 572, the system determines not to generate the additional prompt, the system can refrain from generating the additional prompt and proceed to block 574. Block 574 is described below. If, at an iteration of block 562, the system determines to generate the additional prompt, the system can generate the additional prompt and may proceed to block 564. In generating the additional prompt, the system identifies one or more additional particular alphanumeric characters, from among one or more of the corresponding alphanumeric characters, that is associated with the corresponding predicted measure that fails to satisfy the threshold, and generates the additional clarification request that requests additional clarification with respect to one or more of the additional particular alphanumeric characters. Continuing with the above example, further assume the system is not confident in whether the given unique personal identifier corresponds to "johnp" or "johnd". In this example, the system can identify the token of "p" and/or the token of "d" and generate the additional prompt of "and was that p as in papa or d as in delta", "so it's j o h n and then p", "so it's john and then d", etc. Further assume the prompt includes the clarification request of "and was that p as in papa or d as in delta", assume that the prompt is rendered audibly for presentation to the human, and assume the human provides the additional spoken utterance that indicates that unique personal identifier includes "p as in papa". Accordingly, in processing one or more further additional ASR speech hypothesis, the system can refine the given unique personal identifiers to include the token of "p", and to update the corresponding predicted measure associated with the token of "p" to indicate that the system is highly confident in the given unique personal identifier including the token of "p". In implementations where the given unique personal identifier is generated based on the tree of possibilities, any alternative nodes for the token of "p" can be removed from the tree of possibilities, such as a "d" node.

The system can repeat the process of block 564, 566, 568, 570, and 572 until the system determines that the corresponding predicted measure associated with each of the one or more given alphanumeric characters for the refined given unique personal identifier satisfies the threshold. In other words, the system can continue to prompt the human to clarify one or more of the corresponding alphanumeric characters until the system is sufficiently confident that the refined given unique personal identifier is, in fact, the unique personal identifier for the human that was originally provided by the human.

At block 574, the system causes the voice bot to utilize the unique personal identifier in furtherance of the corresponding conversation. In implementations where the corresponding conversation is during a telephone call between the voice bot and the human, the voice bot can utilize the unique personal identifier to continue performance of a task requested by the human (e.g., for customer service, for inquiries related to a user account, and/or any other task that may be performed during a telephone call). For example, the voice bot can utilize the unique personal identifier to verify or authenticate an identity of the human, to search for information related to the unique personal identifier, and/or any other manner in which the voice bot can utilize the unique personal identifier to continue performance of the telephone call. In implementations where the corresponding conversation is during a dialog session between the voice bot and the human, the voice bot can utilize the unique personal identifier to incorporate the unique personal identifier into a transcription (e.g., while the human is utilizing the voice bot to dictate an email, a text message, an SMS message, a note, a calendar entry, and/or otherwise dictating to the voice bot), to perform an action on behalf of the user (e.g., making a purchase on behalf of the user, logging into an account of a user, and/or any other action on behalf of the user), and/or any other manner in which the voice bot can utilize the unique personal identifier to continue performance of the dialog.

Figure 6A:
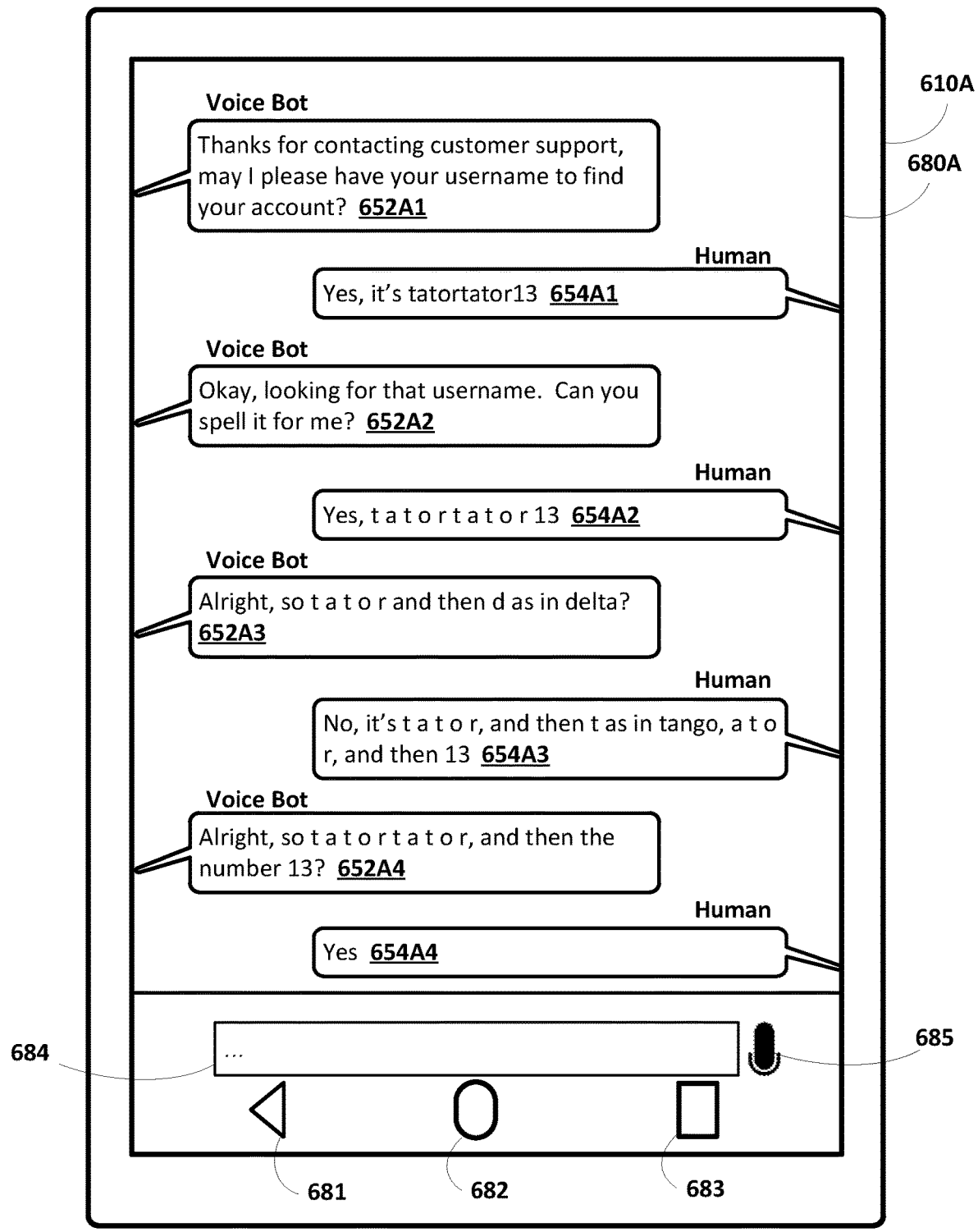
FIGS. 6A, 6B, and 6C depict various non-limiting examples of corresponding conversations between a voice bot and a human that include determining unique personal identifiers, in accordance with various implementations.
Figure 6B:
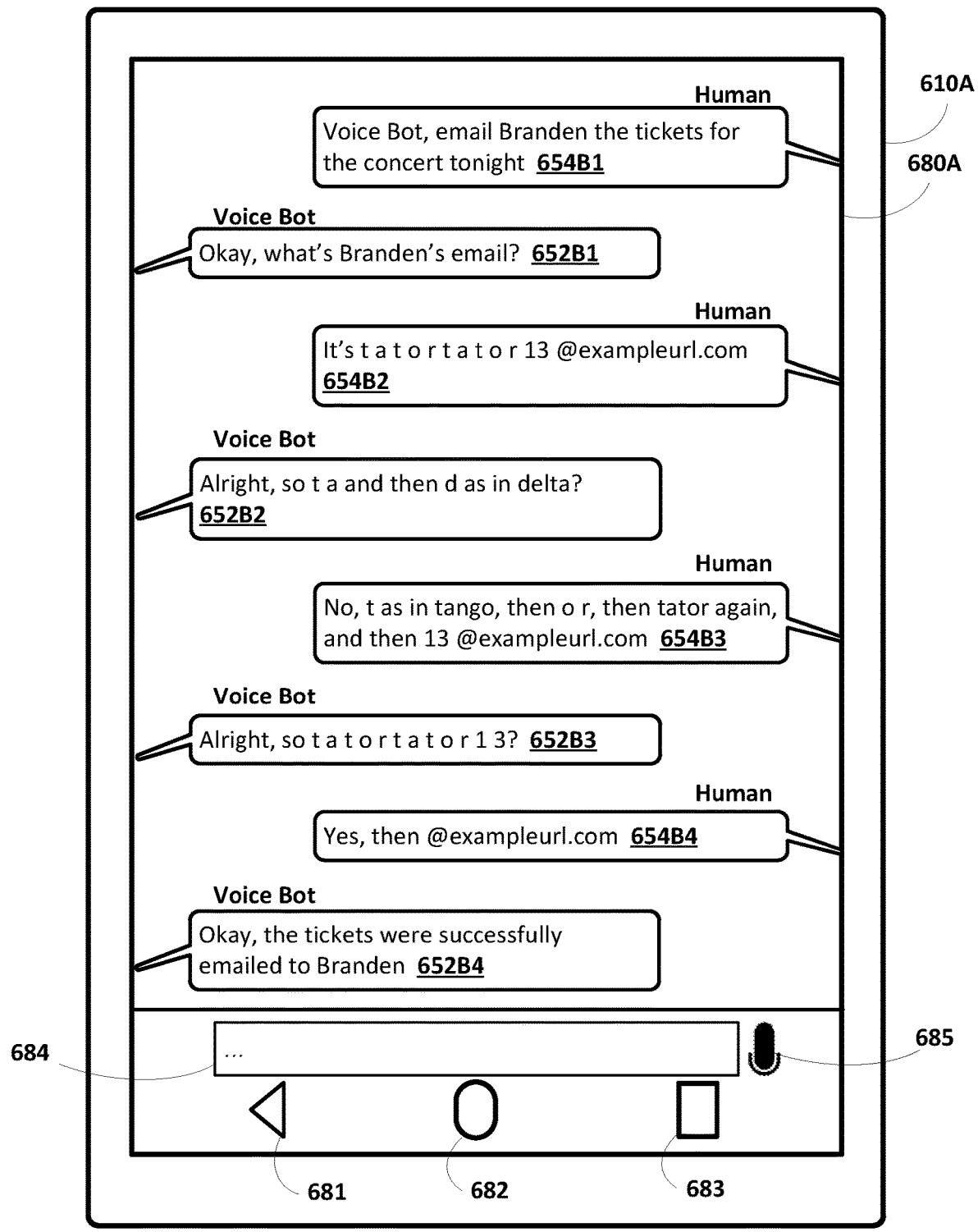
Figure 6C:
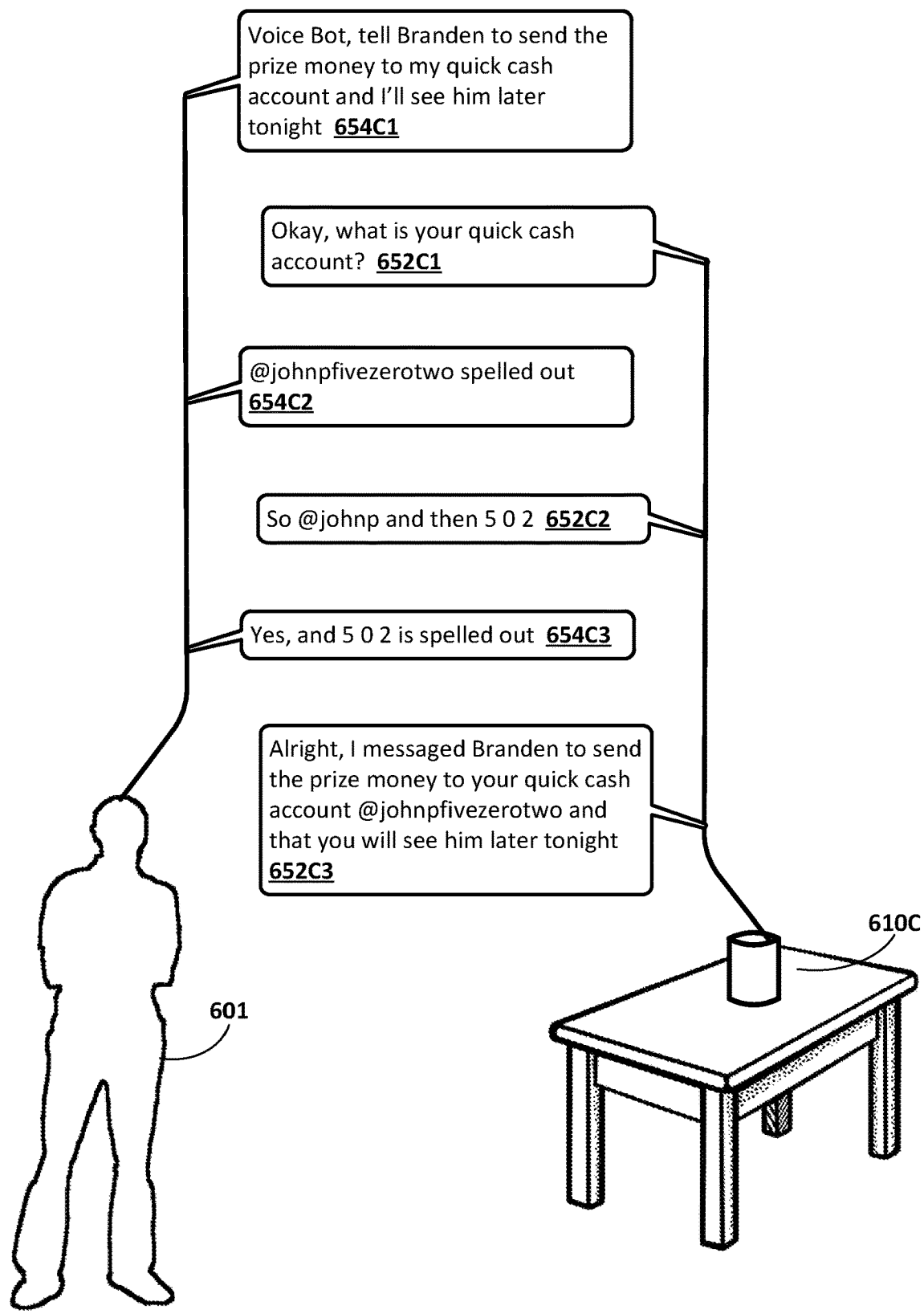

Turning now to FIGS. 6A-6C, various non-limiting examples of corresponding conversations between a voice bot and a human that include determining unique personal identifiers are depicted. FIGS. 6A and 6B each depict a client device 610A having a graphical user interface 680A, and may include one or more of the components of the client device 110 of FIG. 1, one of the additional client devices 195 of FIG. 1, computing device 710 of FIG. 7, and/or components of any other client device. One or more aspects of a voice bot may be implemented locally on the client device 610A and/or on other client device(s) that are in network communication with the client device 610A. For the sake of simplicity, operations of FIGS. 6A and 6B are described herein as being performed by the voice bot. Although the client device 610A of FIGS. 6A and 6B is depicted as a smartphone, it should be understood that is not meant to be limiting. For example, FIG. 6C depicts a client device 610C as a stand-alone assistant device not having any display. As other examples, the client device 610A and/or 610C may be a stand-alone assistant device having a display, a laptop, a desktop computer, a vehicular computing device, and/or any other client device capable of making telephonic calls and/or engaging in a human-to-computer dialog.

The graphical user interface 680A of FIGS. 6A and 6B further includes a textual reply interface element 684 that the user may select to generate user input via a virtual keyboard or other touch and/or typed input, and a voice reply interface element 685 that the user may select to generate user input via microphone(s) of the client device 610A. In some implementations, the user may generate user input via the microphone(s) without selection of the voice reply interface element 685. For example, active monitoring for audible user input via the microphone(s) may occur to obviate the need for the user to select the voice reply interface element 685. For instance, active monitoring for audible user input during a telephone call and/or for audible user input that includes a particular word or phrase may occur to obviate the need for the user to select the voice reply interface element 685. In some of those and/or in other implementations, the voice reply interface element 685 may be omitted. Moreover, in some implementations, the textual reply interface element 684 may additionally and/or alternatively be omitted (e.g., the user may only provide audible user input). The graphical user interface 680A of FIGS. 6A and 6B also includes system interface elements 681, 682, 683 that may be interacted with by the user to cause the client device 610A to perform one or more actions.

For example, and referring specifically to FIG. 6A, assume the human associated with the client device 610A initiated a corresponding telephone call with customer service of a hypothetical technology company named Example Widgets. Further assume that Example Widgets employs a voice bot that is trained to handle incoming telephone calls for customer service requests, and that has access to a plurality of ML layers, of one or more ML models, trained according to techniques described herein (e.g., with respect to FIGS. 2A and 4) and utilized in determining unique personal identifiers during corresponding conversations. In this example, the corresponding telephone call can be performed using various voice communication protocols including, for example, VoIP, PSTN, and/or other telephonic communication protocols. As described herein, synthesized speech can be rendered as part of the corresponding telephone call by the voice bot, and on behalf of Example Widgets, which can include injecting the synthesized speech into the corresponding telephone call so that it is perceivable by the human associated with the client device 610A. The synthesized speech can be generated and/or injected by the client device 610A that is one of the endpoints of the corresponding telephone call and/or can be generated and/or injected by a server that is in communication with the client device 610A, and is also connected to the corresponding telephone call.

Further assume the human associated with the client device 610A navigated the corresponding telephone call to a point where the voice bot causes synthesized speech 652A1 of "Thanks for contacting customer support, may I please have your username?" to be rendered for presentation to the human associated with the client device 610A. For example, the human may select a "customer service" option, from among a plurality of options, presented to the user via an interactive voice response (IVR) system, the human may provide freeform input of "customer service" when prompted to provide a reason for initiating the corresponding telephone call, and/or any other manner of navigating the corresponding telephone call to the point where the voice bot causes synthesized speech 652A1 to be rendered for presentation to the human associated with the client device 610A. Further assume the human provides spoken utterance 654A1 of "Yes, it's tatortator13" in response to the synthesized speech 652A1 being rendered. In this example, the username "tatortator13" provided by the human associated with the client device 610A is a unique personal identifier for the human's account that is associated with Example Widgets.

The voice bot can process, using an ASR model, audio data corresponding to the spoken utterance 654A1 to generate a plurality of ASR speech hypotheses for the spoken utterance 654A1. Further, in response to predicting the spoken utterance 654A1 includes the unique personal identifier, the voice bot can process, using a plurality of ML layers of one or more ML models that are trained using techniques described herein (e.g., with respect to FIGS. 1, 2A, and/or 4), one or more of the plurality of ASR speech hypotheses to generate one or more candidate unique personal identifiers and a corresponding predicted measure associated with corresponding alphanumeric character of each of the one or more candidate unique personal identifiers. In some implementations, the voice bot can predict the spoken utterance 654A1 includes the unique personal identifier based on the synthesized speech 652A1 including a request that the human provide the unique personal identifier (e.g., "may I please have your username" being included in the synthesized speech 652A1). In additional or alternative implementations, the voice bot can predict the spoken utterance 654A1 includes the unique personal identifier based on one or more of the plurality of ASR speech hypotheses.

In some implementations, in generating one or more of the candidate unique personal identifiers and the corresponding predicted measures, the voice bot can generate a tree of possibilities for the unique personal identifier included in the spoken utterance 654A1 based on output generated across the plurality of ML layers. For example, assume a given ASR speech hypothesis for the unique personal identifier corresponds to tokens of "tator dater 13" (and are optionally associated with respective measures for one or more of the tokens). In this example, the voice bot can process, using the plurality of ML layers, the tokens for the given ASR speech hypothesis to generate output. Further, the voice bot can generate the tree of possibilities based on the output. The tree of possibilities can include a plurality of nodes corresponding to alphanumeric characters for the unique personal identifier and corresponding predicted measures associated with each of the alphanumeric characters, and can include a plurality of edges connecting the plurality of nodes (e.g., as described with respect to FIG. 2B). Moreover, the voice bot can generate one or more of the candidate unique personal identifiers based on the tree of possibilities. For example, the voice bot can identify a first node corresponding to the token "t", a second node corresponding to the token "a" connected to the first node by a first edge, a third node corresponding to the token "t" connected to the second node by a second edge, a fourth node corresponding to the token "o" connected to the third node by a third edge, a fifth node corresponding to the token "r" connected to the fourth node by a fourth edge, and so on to generate a first candidate unique personal identifier that includes at least the alphanumeric characters "t a t o r". In this example, the voice bot can identify a first alternative node corresponding to the token "d" that is connected to the second node by an alternative first edge, and can utilize the second through fifth nodes to generate a second candidate unique personal identifier that includes at least the alphanumeric characters "d a t o r". It should be understood that the nodes and edges are scalable to include a plurality of additional nodes corresponding to alphanumeric characters (and including the corresponding predicted measures) and a plurality of additional edges, and that this example is provided for illustrative purposes. Notably, the one or more candidate unique personal identifiers generated based on the tree of possibilities can include every combination of alphanumeric characters, a subset thereof that only includes alphanumeric characters that are associated with corresponding predicted measures that satisfy a threshold, and/or those identified in response to a beam search across the tree of possibilities.

In additional or alternative implementations, in generating one or more of the candidate unique personal identifiers and the corresponding predicted measures, the voice bot can generate one or more of the candidate unique personal identifiers based on output generated across the plurality of ML layers. For example, assume a given ASR speech hypothesis for the unique personal identifier corresponds to tokens of "tator dater 13" (and are optionally associated with respective measures for one or more of the tokens). In this example, the voice bot can process, using the plurality of ML layers, the tokens for the given ASR speech hypothesis to generate output. In this example, the output generated across the model can be an n-dimensional vector (e.g., where n is a positive integer) that includes one or more of the candidate unique personal identifiers. For instance, the output can include at least a first candidate unique personal identifier that includes at least the alphanumeric characters "t a t o r", a second candidate unique personal identifier that includes at least the alphanumeric characters "d a t o r", and/or other strings of alphanumeric characters that are predicted to correspond to one or more portions of the unique personal identifier captured in the spoken utterance 654A1.

The voice bot can generate one or more prompts that include corresponding clarification requests that request clarification of the unique personal identifier. For example, the voice bot can generate a prompt requesting the human spell the unique personal identifier or a portion thereof, requesting the human clarify a particular alphanumeric character included in the unique personal identifier, requesting the human verify that the unique personal identifier perceived by the voice bot is, in fact, the unique personal identifier, and/or any other request related to determining the unique personal identifier. For instance, in response to the human associated with the computing device 610A providing the spoken utterance 654A1 that includes the unique personal identifier, assume the voice bot generates and renders synthesized speech 652A2 of "Okay, looking for that username, can you spell it for me?" Notably, the synthesized speech 652A2 includes a prompt that requests the human spell the username. In some implementations, the voice bot may prompt the human to spell the unique personal identifier in response to determining that the corresponding predicted measure for a first alphanumeric character for the one or more candidate unique personal identifiers fails to satisfy a threshold. In additional or alternative implementations, the voice bot may prompt the human to spell the unique personal identifier in response to determining that the corresponding predicted measure for each alphanumeric character for the one or more candidate unique personal identifiers fails to satisfy a threshold.

Further assume the human provides a spoken utterance 654A2 of "Yes, t a t o r t a t o r 13" in response to the synthesized speech 652A2 being rendered. The voice bot can process, using the ASR model, audio data corresponding to the spoken utterance 654A2 to generate a plurality of additional ASR speech hypotheses for the spoken utterance 654A2. Further, the voice bot can process, using the plurality of ML layers, one or more of the plurality of additional ASR speech hypotheses to refine one or more of the candidate unique personal identifiers and/or the corresponding predicted measure associated with the corresponding alphanumeric character of each of the one or more candidate unique personal identifiers. For example, the voice bot can update the corresponding predicted measures to indicate the voice bot is highly confident that the alphanumeric character of the unique personal identifier corresponds to the letter "t". For instance, the voice bot can generate synthesized speech 652A3 of "Alright, so t a to r and then d as in delta?" This indicates the voice bot is highly confident in the alphanumeric characters of the unique personal identifier corresponding to the letters "t a t o r", but is not confident in what follows the letter "r". Notably, the synthesized speech 652A3 includes a prompt that requests the human clarify the alphanumeric character that follows the letter "r" (e.g., "and then d as in delta?").

Further assume the human provides a spoken utterance 654A3 of "No, it's t a t o r and then t as in tango, a t o r, and then 13" in response to the synthesized speech 652A3 being rendered. The voice bot can process, using the ASR model, audio data corresponding to the spoken utterance 654A3 to generate a plurality of further additional ASR speech hypotheses for the spoken utterance 654A3. Further, the voice bot can process, using the plurality of ML layers, one or more of the plurality of further additional ASR speech hypotheses to further refine one or more of the candidate unique personal identifiers and/or the corresponding predicted measure associated with the corresponding alphanumeric character of each of the one or more candidate unique personal identifiers. For example, in implementations where the voice bot generates one or more of the candidate unique personal identifiers based on the tree of possibilities, the voice bot can remove or ignore an alternative nodes for at least the first six alphanumeric characters (e.g., t a t o r t). As another example, in implementations where the voice bot generates one or more of the candidate unique personal identifiers based on output generated across the model, the voice bot can prune any of the candidate unique personal identifiers that do not confirm with at least the first six alphanumeric characters (e.g., t a t o r t). This process of prompting the human with the corresponding clarification requests and refining one or more of the candidate unique personal identifiers can be repeated until the voice bot is sufficiently confident that a given one of the one or more candidate unique personal identifiers is the unique personal identifier provided by the human. For instance, the voice bot can generate synthesized speech 65243 of "Alright, so t a t o r t a t o r, and then the number 13?" This indicates the voice bot is highly confident that the given one of the one or more candidate unique personal identifiers is, in fact, the unique personal identifier provided by the human in the spoken utterance 654A1 (and as verified by the human by spoken utterance 654A4 of "Yes"). The voice bot can then utilize the determined unique personal identifier in furtherance of the corresponding telephone call.

In various implementations, and along with one or more of the plurality of ASR speech hypotheses described throughout the above process of FIG. 6A, the voice bot can process an intent of the voice bot using the plurality of ML layers. The intent of the voice bot can include, for example, requesting the human provide the unique personal identifier (e.g., associated with the synthesized speech 652A1 described above), requesting the human spell the unique personal identifier (e.g., associated with the synthesized speech 652A2 described below), requesting the human clarify one or more alphanumeric characters included in the unique personal identifier (e.g., associated with the synthesized speech 652A3 described above), requesting the human verify a given one of the one or more candidate unique personal identifiers as the unique personal identifier for the human (e.g., associated with the synthesized speech 652A4 described above), and/or any other intent related to determining the unique personal identifier for the human associated with the client device 610A. By processing the intent of the voice bot along with one or more of the plurality of ASR speech hypotheses, the voice bot can more quickly and efficiently determine the unique personal identifier for the human associated with the client device 610A by restricting one or more of the candidate unique personal identifiers based on the intent of the voice bot.

Although FIG. 6A is described with respect to determining the unique personal identifier of the human associated with the client device 610A during the corresponding telephone call, it should be understood that is for the sake of example and is not meant to be limiting. For example, and referring specifically to FIG. 6B, assume the human associated with the client device 610A initiated a corresponding dialog session with the voice bot by providing a spoken utterance 654B1 of "Voice Bot, email Branden the tickets for the concert tonight". In this example, the voice bot can process, using an ASR model, audio data corresponding to the spoken utterance 654B1 to determine the spoken utterance corresponds to a request for the voice bot to send an email to Branden that includes tickets for a concert tonight. However, assume the email for Branden is not readily ascertainable by the voice bot, and assume that the voice bot generates and renders synthesized speech 652B1 of "Okay, what's Branden's email?" at the client device 610A. In this example, the unique personal identifier is an email address for another human (e.g., Branden), the email address can be provided in a spoken utterance 654B2, and the voice bot can prompt the human associated with the client device 610A via further synthesized speech (e.g., 652B2 and 652B3) and refine one or more candidate unique personal identifiers based on further spoken utterances of the human (e.g., 654B3 and 654B4) that are responsive to the corresponding prompts in the same or similar manner described with respect to FIG. 6A. Further, the voice bot can cause synthesized speech 652B4 to be generated and rendered for presentation to the human associated with the client device 610A when the action is performed (e.g., that the tickets were successfully emailed to Branden).

Moreover, although transcriptions for the corresponding telephone call described with respect to FIG. 6A and the corresponding dialog session described with respect to FIG. 6B are depicted, it should be understood that is for the sake of illustration of the corresponding conversations and is not meant to be limiting. For example, and referring specifically to FIG. 6C, the client device 610C is depicted as lacking a display. Further, assume the human associated with the client device 610C (e.g., human 601 shown in FIG. 6C) initiated a corresponding dialog session with the voice bot by providing a spoken utterance 654C1 of "Voice Bot, tell Branden to send the prize money to my quick cash account and I'll see him later tonight". However, assume the human's quick cash account is not readily ascertainable by the voice bot, and assume that the voice bot generates and renders synthesized speech 652C1 of "Okay, what is your quick cash account?" at the client device 610C. In this example, the unique personal identifier is an account for the human associated with the client device 610C, the account can be provided in a spoken utterance 654C2, and the voice bot can prompt the human associated with the client device 610A via further synthesized speech (e.g., 652C2) and refine one or more candidate unique personal identifiers based on further spoken utterances of the human (e.g., 654C3) that are responsive to the corresponding prompts in the same or similar manner described with respect to FIG. 6A. Further, the voice bot can cause synthesized speech 652C3 to be generated and rendered for presentation to the human associated with the client device 610A when the action is performed (e.g., that the message was successfully sent to Branden).

It should be understood that the example unique personal identifiers, prompts, responses, and/or any other aspect of the corresponding conversations described with respect to FIGS. 6A-6C are provided merely for illustrative purposes and are not meant to be limiting. For example, the unique personal identifiers can include any other sequence of alphanumeric characters for a human that are personal to a human. As another example, the prompts generated by the voice bot and rendered for presentation to the human may depend on the corresponding predicted measures associated with one or more of the candidate unique personal identifiers, and the responses provided by the human may be freeform typed input or spoken input. As yet another example, the corresponding conversations (and any task performed by the voice bot during the corresponding conversations) may depend on a need of the human that is participating in the corresponding conversation. Nonetheless, the techniques described herein can be utilized by the voice bot in any of these scenarios to determine unique personal identifiers provided by the human.

Figure 7:
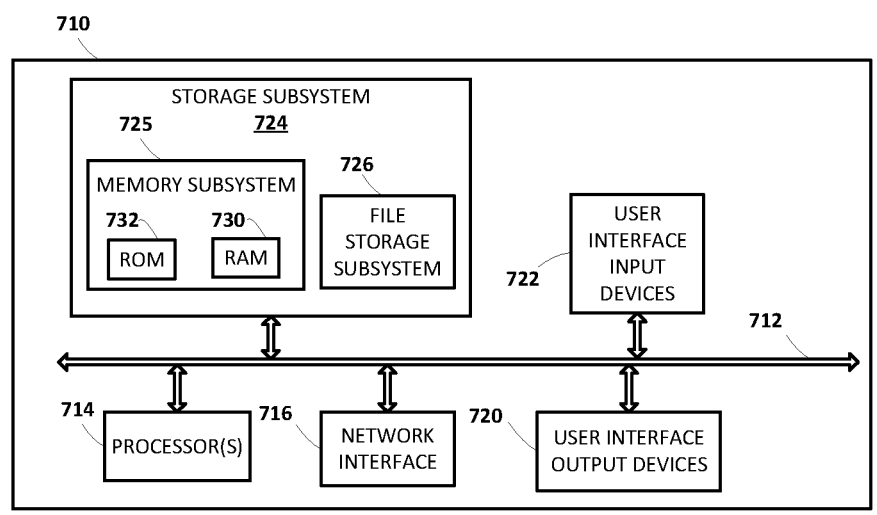
FIG. 7 depicts an example architecture of a computing device, in accordance with various implementations.

FIG. 7 is a block diagram of an example computing device 710 that may optionally be utilized to perform one or more aspects of techniques described herein. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving audio data capturing a spoken utterance of a human, the spoken utterance being received by a voice bot during a corresponding conversation between the human and the voice bot; processing, using an automatic speech recognition (ASR) model, the audio data to generate a plurality of ASR speech hypotheses; and in response to predicting the spoken utterance includes a unique personal identifier, the unique personal identifier including a unique sequence of alphanumeric characters that is personal to the human: processing, using a plurality of machine learning (ML) layers of one or more ML models, one or more of the plurality of ASR speech hypotheses to generate one or more candidate unique personal identifiers, each of the one or more candidate unique personal identifiers including a corresponding predicted measure associated with one or more corresponding alphanumeric characters for each of the one or more candidate unique personal identifiers; selecting, based on the corresponding predicted measure associated with one or more of the corresponding alphanumeric characters for each of the one or more candidate unique personal identifiers, one or more given alphanumeric characters from among one or more of the corresponding alphanumeric characters; generating, based on the corresponding predicted measure associated with one or more of the given alphanumeric characters, a prompt that includes a clarification request that requests clarification of one or more of the given alphanumeric characters; and causing the prompt to be provided for presentation to the human.

These and other implementations of technology disclosed herein can optionally include one or more of the following features.

In some implementations, the method may further include, in response to the prompt being provided for presentation to the human: receiving additional audio data capturing an additional spoken utterance of the human, the additional spoken utterance being received by the voice bot during the corresponding conversation; processing, using the ASR model, the additional audio data to generate a plurality of additional ASR speech hypotheses; and processing, using the plurality of ML layers, one or more of the plurality of additional speech hypotheses to refine one or more of the given alphanumeric characters.

In some versions of those implementations, refining one or more of the given alphanumeric characters may include updating the corresponding predicted measure for the one or more given alphanumeric characters that are predicted to correspond to the unique personal identifier based on the clarification received responsive to the clarification request.

In some versions of those implementations, the method may further include, until the one or more given alphanumeric characters are predicted to correspond to the unique personal identifier of the human: generating, based on the corresponding predicted measure associated with one or more of the given alphanumeric characters, one or more corresponding additional prompts that each include a corresponding additional clarification request that requests additional clarification of one or more of the given alphanumeric characters; and causing one or more of the corresponding additional prompts to be provided for presentation to the human. In some further versions of those implementations, predicting that the one or more given alphanumeric characters correspond to the unique personal identifier of the human may include determining the corresponding predicted measure associated with each of the given alphanumeric characters satisfies a threshold. In yet further versions of those implementations, the method may further include, in response to predicting the one or more given alphanumeric characters correspond to the unique personal identifier of the human: utilizing a given unique personal identifier, that includes the one or more given alphanumeric characters, in furtherance of the corresponding conversation between the voice bot and the human.

In some implementations, generating the prompt that includes the clarification request may be in response to determining the corresponding predicted measure associated with one or more of the given alphanumeric characters fails to satisfy a threshold. In some versions of those implementations, generating the prompt that includes the clarification request may include identifying one or more particular alphanumeric characters, from among one or more of the given alphanumeric characters, that are associated with the corresponding predicted measure that fails to satisfy the threshold; and generating the clarification request that requests clarification with respect to one or more of the particular alphanumeric characters.

In some implementations, the method may further include, in response to predicting the one or more given alphanumeric characters correspond to the unique personal identifier of the human: utilizing a given unique personal identifier, that includes the one or more given alphanumeric characters, in furtherance of the corresponding conversation between the voice bot and the human. In some versions of those implementations, predicting that the one or more given alphanumeric characters correspond to the unique personal identifier of the human may include determining the corresponding predicted measure associated with each of the one or more given alphanumeric characters for the given candidate unique personal identifier satisfies a threshold.

In some implementations, predicting the spoken utterance includes the unique personal identifier may include predicting that the audio data will include the unique personal identifier based on synthesized speech audio data including synthesized speech that was previously provided for presentation to the human by the voice bot during the corresponding conversation.

In some implementations, predicting the spoken utterance includes the unique personal identifier may include predicting the spoken utterance includes the unique personal identifier based on one or more of the plurality of ASR speech hypotheses generated using the ASR model.

In some implementations, processing one or more of the plurality of speech hypotheses to generate the one or more candidate unique personal identifier may include iteratively processing each of the plurality of ASR speech hypotheses using the plurality of ML layers to iteratively generate a tree of possibilities for the unique personal identifier, the tree of possibilities including a plurality of nodes and a plurality of edges, each of the plurality of nodes corresponding to one or more of the corresponding alphanumeric characters for each of the one or more corresponding alphanumeric characters, each of the plurality of nodes being associated with the corresponding predicted measure for each of the one or more corresponding alphanumeric characters, and each of the plurality of nodes being connected by one or more of the plurality of edges. Selecting the given candidate unique personal identifier may be based on the tree of possibilities. In some versions of those implementations, the tree of possibilities may be constrained by the plurality of ASR speech hypotheses. In some further versions of those implementations, the tree of possibilities may be constrained by a plurality of unique personal identifiers stored in one or more databases.

In some implementations, processing one or more of the plurality of speech hypotheses to generate the one or more candidate unique personal identifier may include processing each of the plurality of ASR speech hypotheses using the plurality of ML layers to generate a tree of possibilities for the unique personal identifier, the tree of possibilities including a plurality of nodes and a plurality of edges, each of the plurality of nodes corresponding to one or more of the corresponding alphanumeric characters for each of the one or more corresponding alphanumeric characters, each of the plurality of nodes being associated with the corresponding predicted measure for each of the one or more corresponding alphanumeric characters, and each of the plurality of nodes being connected by one or more of the plurality of edges. Selecting the given candidate unique personal identifier may be based on the tree of possibilities.

In some implementations, the unique personal identifier may be one or more of: an email address, a physical address, a username, a password, a name of an entity, or a domain name.

In some implementations, the method may further include obtaining an intent of the voice bot for a portion of the corresponding conversation between the voice bot and the human. Processing one or more of the plurality of ASR speech hypotheses using the plurality of ML layers to generate one or more of candidate unique personal identifiers may further include processing the intent of the voice bot using the plurality of ML layers to generate one or more of the candidate unique personal identifiers. In some versions of those implementations, the intent of the voice bot includes one or more of: requesting the human provide the unique personal identifier; requesting the human spell the unique personal identifier; or requesting the human provide the clarification of one or more of the given alphanumeric characters.

In some implementations, a method implemented by one or more processors is provided, and includes receiving audio data capturing a spoken utterance of a human, the spoken utterance being received by a voice bot during a corresponding conversation between the human and the voice bot; processing, using an automatic speech recognition (ASR) model, the audio data to generate a plurality of ASR speech hypotheses; and in response to predicting the spoken utterance includes a unique personal identifier, the unique personal identifier including a unique sequence of alphanumeric characters that is personal to a given user: processing, using a plurality of machine learning (ML) layers of one or more ML models, one or more of the plurality of ASR speech hypotheses to generate one or more candidate unique personal identifiers, each of the one or more candidate unique personal identifiers including a corresponding predicted measure associated with one or more corresponding alphanumeric characters; and selecting, based on the corresponding predicted measure associated with one or more of the corresponding alphanumeric characters for each of the one or more candidate unique personal identifiers, one or more given alphanumeric characters, from among one or more of the corresponding alphanumeric characters. The method further includes, until the given candidate unique personal identifier is predicted to correspond to the unique personal identifier: generating, based on the corresponding predicted measure associated with one or more of the corresponding alphanumeric characters for the given candidate unique personal identifier, corresponding prompts that include corresponding clarification requests that request clarification of one or more of the corresponding alphanumeric characters for the given candidate unique personal identifier; causing the corresponding prompts to be provided for presentation to the human; and refining the given candidate unique personal identifier based on processing corresponding additional audio data that captures a corresponding additional spoken utterance of the human and that is responsive to the corresponding prompts. The method further includes, in response to predicting the given candidate unique personal identifier corresponds to the unique personal identifier: utilizing a given unique personal identifier, that includes the one or more given alphanumeric characters, in furtherance of the corresponding conversation between the voice bot and the human.

In some implementations, a method implemented by one or more processors is provided, and includes obtaining a plurality of training instances, each of the plurality of training instances including: training instance input, the training instance input including at least one automatic speech recognition (ASR) speech hypothesis for a unique personal identifier, the unique personal identifier including a unique sequence of alphanumeric characters that is personal to a given human, and training instance output, the training instance output including a corresponding ground truth output corresponding to the unique personal identifier. The method further includes training a plurality of machine learning (ML) layers of one or more ML models based on the plurality of training instances; and subsequent to training the plurality of ML layers based on the plurality of training instances: causing a voice bot to utilize the plurality of ML layers in processing one or more ASR speech hypotheses, that are generated while the voice bot is conducting corresponding conversations, to determine unique personal identifiers.

These and other implementations of technology disclosed herein can optionally include one or more of the following features.

In some implementations, training the plurality of ML layers based on a given training instance, of the plurality of training instances, may include processing, using the plurality of ML layers, the at least one ASR speech hypothesis for the unique personal identifier to generate a corresponding predicted measure for each of the alphanumeric characters included in the at least one ASR speech hypothesis for the unique personal identifier; comparing the corresponding predicted measure for each of the alphanumeric characters included in the unique personal identifier to a corresponding ground truth measure for each of the alphanumeric characters included in the corresponding ground truth output corresponding to the unique personal identifier to generate one or more losses; and causing respective weights of one or more of the plurality of ML layers to be updated based on one or more of the losses.

In some implementations, the method may further include subsequent to training the plurality of ML layers based on the plurality of training instances and prior to causing the voice bot to utilize the plurality of ML layers in processing the unique personal identifiers that are encountered while the voice bot is conducting the corresponding conversations, further training the plurality of ML layers utilizing a voice bot-human simulator.

In some versions of those implementations, further training the plurality of ML layers utilizing the voice bot-human simulator may include, for a given training instance of the plurality of training instances, and until a predicted unique personal identifier corresponds to the corresponding ground truth output corresponding to the unique personal identifier: accessing the voice bot-human simulator that simulates a corresponding conversation between the voice bot and the given human; processing, using the plurality of ML layers, the at least one ASR speech hypothesis for the unique personal identifier to generate the predicted unique personal identifier and a corresponding predicted measure for each of the alphanumeric characters; processing, using a simulated voice bot of the voice bot-human simulator, the predicted unique personal identifier and the corresponding predicted measures for the predicted unique personal identifier to generate a simulated prompt for a simulated human; processing, using a simulated human of the voice bot-human simulator, the simulated prompt to generate a simulated response from the simulated human that is responsive to the simulated prompt; and processing, using the plurality of ML layers, the simulated response from the given human to refine the predicted unique personal identifier.

In some further versions of those implementations, the simulated prompt may include a clarification request that requests clarification of one or more of the alphanumeric characters for the predicted unique personal identifier. In yet further versions of those implementations, the simulated response that is responsive to the clarification request may include the clarification of one or more of the alphanumeric characters for the predicted unique personal identifier. In even further versions of those implementations, refining the predicted unique personal identifier may include updating the corresponding predicted measure for one or more of the alphanumeric characters based on the clarification received responsive to the clarification request.

In some further versions of those implementations, causing the voice bot to utilize the plurality of ML layers in processing one or more of the ASR speech hypotheses, that are generated while the voice bot is conducting corresponding conversations, in determining the unique personal identifiers may be further subsequent to the further training of the plurality of ML layers.

In some further versions of those implementations, the method may further include obtaining an intent of the simulated voice bot that is associated with the simulated prompt. Processing the simulated response from the given human to refine the predicted unique personal identifier using the plurality of ML layers may further include processing the intent of the simulated voice bot along with the simulated response to refine the predicted unique personal identifier.

In some implementations, obtaining the plurality of training instances may include generating one or more of the plurality of training instances based on a corresponding previously conducted conversation that includes at least one human. Generating one or more of the plurality of training instances based the corresponding previously conducted conversation that includes the at least one human may include determining the at least one human provided audio data capturing the unique personal identifier during the previously conducted conversation; obtaining the at least one ASR speech hypothesis for the unique personal identifier, the at least one ASR speech hypothesis being generated during the previously conducted conversation based on processing, using an ASR model, the audio data capturing the unique personal identifier; utilizing the at least one ASR speech hypothesis generated based on the audio data capturing the unique personal identifier for the at least one human as the training instance input; and utilizing the corresponding ground truth output corresponding to the unique personal identifier as the training instance output.

In some versions of those implementations, the corresponding previously conducted conversation that includes the at least one human may be between the at least one human and an additional human.

In some versions of those implementations, the corresponding previously conducted conversation that includes the at least one human may be between the at least one human and an instance of the voice bot.

In some implementations, obtaining the plurality of training instances may include synthesizing one or more of the plurality of training instances based on corresponding unique personal identifiers stored in one or more databases. Synthesizing one or more of the plurality of training instances based on the corresponding unique personal identifiers stored in one or more of the databases may include accessing one or more of the databases to identify the unique personal identifier; generating, based on the unique personal identifier, a plurality of tokens; generating, based on the plurality of tokens corresponding to the unique personal identifier, synthesized text; generating, based on the synthesized text, the at least one ASR speech hypothesis for the unique personal identifier; utilizing the at least one ASR speech hypothesis generated based on the synthesized text as the training instance input; and utilizing the unique personal identifier as the training instance output.

In some versions of those implementations, generating the plurality of tokens corresponding to the unique personal identifier may include identifying a plurality of n-grams included in the unique personal identifier identified from one or more of the databases; and generating the plurality of tokens based on a distribution for the plurality of n-grams.

In some further versions of those implementations, generating the synthesized text corresponding to at least the unique personal identifier may include one or more of: injecting one or more fillers into the plurality of tokens; or injecting a phonetic spelling for one or more of the alphanumeric characters included in the unique personal identifier. In some further versions of those implementations, generating the at least one ASR speech hypothesis for the unique personal identifier may include supplanting one or more n-grams of the synthesized text with one or more corresponding homophone n-grams. In some further versions of those implementations, generating the at least one ASR speech hypothesis for the unique personal identifier may include supplanting one or more alphanumeric characters of the synthesized text with one or more corresponding homophone alphanumeric characters.

In some implementations, the unique personal identifier may be one or more of: an email address, a physical address, a username, a password, a name of an entity, or a domain name.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   receiving audio data capturing a spoken utterance of a human, the spoken utterance being received by a voice bot during a corresponding conversation between the human and the voice bot;
   processing, using an automatic speech recognition (ASR) model, the audio data to generate a plurality of ASR speech hypotheses; and
   in response to predicting the spoken utterance includes a unique personal identifier, the unique personal identifier including a unique sequence of alphanumeric characters that is personal to the human:
  processing, using a plurality of machine learning (ML) layers of one or more ML models, one or more of the plurality of ASR speech hypotheses to generate one or more candidate unique personal identifiers, each of the one or more candidate unique personal identifiers including a corresponding predicted measure associated with one or more corresponding alphanumeric characters for each of the one or more candidate unique personal identifiers;
  selecting, based on the corresponding predicted measure associated with one or more of the corresponding alphanumeric characters for each of the one or more candidate unique personal identifiers, one or more given alphanumeric characters from among one or more of the corresponding alphanumeric characters;
  determining, based on comparing the corresponding predicted measure associated with a subset of one or more of the given alphanumeric characters to a predicted measure threshold for the corresponding predicted measures that are generated based on processing one or more of the plurality of ASR speech hypotheses and using the plurality of ML layers of one or more of the ML models, whether to generate a prompt that includes a clarification request that requests clarification of the subset of one or more of the given alphanumeric characters;
  in response to determining that the corresponding predicted measure associated with the subset of one or more of the given alphanumeric characters fails to satisfy the predicted measure threshold:
    generating the prompt that includes the clarification request that requests clarification of the subset of one or more of the given alphanumeric characters; and
    causing the prompt to be provided for presentation to the human; and
  in response to predicting that the one or more given alphanumeric characters correspond to the unique personal identifier of the human:
    utilizing the unique personal identifier, that includes the one or more given alphanumeric characters, in furtherance of the corresponding conversation between the voice bot and the human.

2. The method of claim 1, further comprising:
in response to the prompt being provided for presentation to the human:
  receiving additional audio data capturing an additional spoken utterance of the human, the additional spoken utterance being received by the voice bot during the corresponding conversation;
  processing, using the ASR model, the additional audio data to generate a plurality of additional ASR speech hypotheses; and
  processing, using the plurality of ML layers, one or more of the plurality of additional speech hypotheses to refine one or more of the given alphanumeric characters.

3. The method of claim 2, wherein refining one or more of the given alphanumeric characters comprises:
updating the corresponding predicted measure for the one or more given alphanumeric characters that are predicted to correspond to the unique personal identifier based on the clarification received responsive to the clarification request.

4. The method of claim 2, further comprising:
until the one or more given alphanumeric characters are predicted to correspond to the unique personal identifier of the human:
  generating, based on the corresponding predicted measure associated with a corresponding additional subset of one or more of the given alphanumeric characters, one or more corresponding additional prompts that each include a corresponding additional clarification request that requests additional clarification of the corresponding additional subset of one or more of the given alphanumeric characters; and
  causing one or more of the corresponding additional prompts to be provided for presentation to the human.

5. The method of claim 4, wherein predicting that the one or more given alphanumeric characters correspond to the unique personal identifier of the human comprises:
determining the corresponding predicted measure associated with each of the given alphanumeric characters satisfies a threshold.

6. The method of claim 1, wherein generating the prompt that includes the clarification request comprises:
identifying the subset of one or more of the given alphanumeric characters that are associated with the corresponding predicted measure that fails to satisfy the threshold; and
generating the clarification request that requests clarification with respect to the subset of one or more of the given alphanumeric characters.

7. The method of claim 1, wherein predicting that the one or more given alphanumeric characters correspond to the unique personal identifier of the human comprises:
determining the corresponding predicted measure associated with each of the one or more given alphanumeric characters for the given candidate unique personal identifier satisfies a threshold.

8. The method of claim 1, wherein predicting the spoken utterance includes the unique personal identifier comprises:
predicting that the audio data will include the unique personal identifier based on synthesized speech audio data including synthesized speech that was previously provided for presentation to the human by the voice bot during the corresponding conversation.

9. The method of claim 1, wherein predicting the spoken utterance includes the unique personal identifier comprises:
predicting the spoken utterance includes the unique personal identifier based on one or more of the plurality of ASR speech hypotheses generated using the ASR model.

10. The method of claim 1, wherein processing one or more of the plurality of speech hypotheses to generate the one or more candidate unique personal identifier comprises:
iteratively processing each of the plurality of ASR speech hypotheses using the plurality of ML layers to iteratively generate a tree of possibilities for the unique personal identifier, the tree of possibilities including a plurality of nodes and a plurality of edges, each of the plurality of nodes corresponding to one or more of the corresponding alphanumeric characters for each of the one or more corresponding alphanumeric characters, each of the plurality of nodes being associated with the corresponding predicted measure for each of the one or more corresponding alphanumeric characters, and each of the plurality of nodes being connected by one or more of the plurality of edges, wherein selecting the given candidate unique personal identifier is based on the tree of possibilities.

11. The method of claim 10, wherein the tree of possibilities is constrained by the plurality of ASR speech hypotheses.

12. The method of claim 11, wherein the tree of possibilities is constrained by a plurality of unique personal identifiers stored in one or more databases.

13. The method of claim 1, wherein the unique personal identifier is one or more of: an email address, a physical address, a username, a password, a name of an entity, or a domain name.

14. The method of claim 1, further comprising:
obtaining an intent of the voice bot for a portion of the corresponding conversation between the voice bot and the human; and
wherein processing one or more of the plurality of ASR speech hypotheses using the plurality of ML layers to generate one or more of candidate unique personal identifiers further comprises processing the intent of the voice bot using the plurality of ML layers to generate one or more of the candidate unique personal identifiers.

15. The method of claim 14, wherein the intent of the voice bot comprises one or more of:
requesting the human provide the unique personal identifier;
requesting the human spell the unique personal identifier; or
requesting the human provide the clarification of one or more of the given alphanumeric characters.

16. The method of claim 1, wherein the corresponding conversation between the voice bot and human is a corresponding telephone conversation between the voice bot and the human, and wherein utilizing the unique personal identifier, that includes the one or more given alphanumeric characters, in furtherance of the corresponding telephone conversation between the voice bot and the human.

17. A method implemented by one or more processors, the method comprising:
receiving audio data capturing a spoken utterance of a human, the spoken utterance being received by a voice bot during a corresponding conversation between the human and the voice bot;
processing, using an automatic speech recognition (ASR) model, the audio data to generate a plurality of ASR speech hypotheses;
in response to predicting the spoken utterance includes a unique personal identifier, the unique personal identifier including a unique sequence of alphanumeric characters that is personal to a given user:
processing, using a plurality of machine learning (ML) layers of one or more ML models, one or more of the plurality of ASR speech hypotheses to generate one or more candidate unique personal identifiers, each of the one or more candidate unique personal identifiers including a corresponding predicted measure associated with one or more corresponding alphanumeric characters; and
selecting, based on the corresponding predicted measure associated with one or more of the corresponding alphanumeric characters for each of the one or more candidate unique personal identifiers, one or more given alphanumeric characters, from among one or more of the corresponding alphanumeric characters;

until the given candidate unique personal identifier is predicted to correspond to the unique personal identifier:
determining, based on comparing the corresponding predicted measure associated with a corresponding subset of the one or more of the given alphanumeric characters to a corresponding predicted measure threshold for the corresponding predicted measures that are generated based on processing one or more of the plurality of ASR speech hypotheses and using the plurality of ML layers of one or more of the ML models, whether to generate a corresponding prompt that includes a corresponding clarification request that requests clarification of the corresponding subset of one or more of the given alphanumeric characters;
in response to determining that the corresponding predicted measure associated with the corresponding subset of one or more of the given alphanumeric characters fails to satisfy the corresponding predicted measure threshold:
generating the corresponding prompt that includes the corresponding clarification request that requests clarification of the corresponding subset of one or more of the given alphanumeric characters for the given candidate unique personal identifier;
causing the corresponding prompt to be provided for presentation to the human; and
refining the given candidate unique personal identifier based on processing corresponding additional audio data that captures a corresponding additional spoken utterance of the human and that is responsive to the corresponding prompt; and
in response to predicting the given candidate unique personal identifier corresponds to the unique personal identifier:
utilizing the given unique personal identifier, that includes the one or more given alphanumeric characters, in furtherance of the corresponding conversation between the voice bot and the human.

18. A system comprising:
one or more processors; and
memory storing instructions that, when executed, cause one or more of the processors to:
receive audio data capturing a spoken utterance of a human, the spoken utterance being received by a voice bot during a corresponding conversation between the human and the voice bot;
process, using an automatic speech recognition (ASR) model, the audio data to generate a plurality of ASR speech hypotheses; and
in response to predicting the spoken utterance includes a unique personal identifier, the unique personal identifier including a unique sequence of alphanumeric characters that is personal to the human:
process, using a plurality of machine learning (ML) layers of one or more ML models, one or more of the plurality of ASR speech hypotheses to generate one or more candidate unique personal identifiers, each of the one or more candidate unique personal identifiers including a corresponding predicted measure associated with one or more corresponding alphanumeric characters for each of the one or more candidate unique personal identifiers;
select, based on the corresponding predicted measure associated with one or more of the corresponding alphanumeric characters for each of the one or more candidate unique personal identifiers, one or more given alphanumeric characters from among one or more of the corresponding alphanumeric characters;

determine, based on comparing the corresponding predicted measure associated with a subset of one or more of the given alphanumeric characters to a predicted measure threshold for the corresponding predicted measures that are generated based on processing one or more of the plurality of ASR speech hypotheses and using the plurality of ML layers of one or more of the ML models, whether to generate a prompt that includes a clarification request that requests clarification of the subset of one or more of the given alphanumeric characters;

in response to determining that the corresponding predicted measure associated with the subset of one or more of the given alphanumeric characters fails to satisfy the predicted measure threshold:
- generate the prompt that includes the clarification request that requests clarification of the subset of one or more of the given alphanumeric characters; and
- cause the prompt to be provided for presentation to the human; and in response to predicting that the one or more given alphanumeric characters correspond to the unique personal identifier of the human:
- utilize the unique personal identifier, that includes the one or more given alphanumeric characters, in furtherance of the corresponding conversation between the voice bot and the human.

\* \* \* \* \*